US009633447B2

(12) United States Patent
Swaminathan et al.

(10) Patent No.: US 9,633,447 B2
(45) Date of Patent: *Apr. 25, 2017

(54) ADAPTABLE FRAMEWORK FOR CLOUD ASSISTED AUGMENTED REALITY

(71) Applicant: QUALCOMM Incorporated, San Diego, CA (US)

(72) Inventors: Ashwin Swaminathan, San Diego, CA (US); Piyush Sharma, San Diego, CA (US); Bolan Jiang, San Diego, CA (US); Murali R. Chari, San Diego, CA (US); Serafin Diaz Spindola, San Diego, CA (US); Pawan Kumar Baheti, Bangalore (IN); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,936

(22) Filed: Jun. 10, 2016

(65) Prior Publication Data

US 2016/0284099 A1    Sep. 29, 2016

Related U.S. Application Data

(63) Continuation of application No. 13/235,847, filed on Sep. 19, 2011, now Pat. No. 9,495,760.

(Continued)

(51) Int. Cl.
*G06K 9/00* (2006.01)
*G06T 7/20* (2017.01)
(Continued)

(52) U.S. Cl.
CPC ........ *G06T 7/2033* (2013.01); *G06K 9/00671* (2013.01); *G06T 7/246* (2017.01); *G06T 7/73* (2017.01); *G06T 2207/10004* (2013.01)

(58) Field of Classification Search
None
See application file for complete search history.

(56) References Cited

U.S. PATENT DOCUMENTS 6,118,456 A    9/2000  Cooper
7,656,822 B1 *  2/2010  AbdelAziz .......... H04L 12/4633
                                                    370/255

(Continued)

FOREIGN PATENT DOCUMENTS

CN    101383910 A    3/2009
EP     1089198 A2    4/2001

(Continued)

OTHER PUBLICATIONS

Dimou, et al., "Scene Change Detection for H.264 Using Dynamic Threshold Techniques," 5th EURASIP Conference on Speech and Image Processing, Multimedia Communications and Service, Jun. 29-Jul. 25, 2005, Smolenice, Slovak Republic, 6 pgs.

(Continued)

*Primary Examiner* — Nancy Bitar
(74) *Attorney, Agent, or Firm* — Silicon Valley Patent Group LLP

(57) ABSTRACT

A mobile platform efficiently processes image data, using distributed processing in which latency sensitive operations are performed on the mobile platform, while latency insensitive, but computationally intensive operations are performed on a remote server. The mobile platform acquires image data, and determines whether there is a trigger event to transmit the image data to the server. The trigger event may be a change in the image data relative to previously acquired image data, e.g., a scene change in an image. When a change is present, the image data may be transmitted to the server for processing. The server processes the image data and returns information related to the image data, such as identification of an object in an image or a reference image (Continued)

or model. The mobile platform may then perform reference based tracking using the identified object or reference image or model.

42 Claims, 14 Drawing Sheets

Related U.S. Application Data

(60) Provisional application No. 61/384,667, filed on Sep. 20, 2010.

(51) Int. Cl.
*G06T 7/73* (2017.01)
*G06T 7/246* (2017.01)

(56) References Cited

U.S. PATENT DOCUMENTS

| | | | |
|---|---|---|---|
| 7,932,938 B2 | 4/2011 | Subbotin | |
| 8,284,238 B2* | 10/2012 | Stone | G06T 7/536 348/46 |
| 8,392,450 B2* | 3/2013 | Blanchflower | H04N 21/4524 382/100 |
| 8,402,050 B2 | 3/2013 | Kim et al. | |
| 8,433,336 B2 | 4/2013 | Lee et al. | |
| 8,447,329 B2 | 5/2013 | Kadirkamanathan et al. | |
| 8,488,011 B2 | 7/2013 | Blanchflower et al. | |
| 8,493,323 B2 | 7/2013 | Griffin | |
| 8,493,353 B2 | 7/2013 | Blanchflower et al. | |
| 8,521,128 B1 | 8/2013 | Welsh et al. | |
| 9,495,760 B2* | 11/2016 | Swaminathan | G06T 7/2033 |
| 2009/0066784 A1 | 3/2009 | Stone et al. | |
| 2009/0313141 A1 | 12/2009 | Kon | |
| 2010/0191459 A1* | 7/2010 | Carter | G01C 21/32 701/532 |
| 2010/0194862 A1 | 8/2010 | Givon | |
| 2010/0214111 A1 | 8/2010 | Schuler et al. | |
| 2010/0220891 A1 | 9/2010 | Lefevre et al. | |
| 2010/0257252 A1 | 10/2010 | Dougherty et al. | |
| 2010/0309225 A1 | 12/2010 | Gray et al. | |
| 2011/0007069 A1 | 1/2011 | Lee | |
| 2011/0038549 A1 | 2/2011 | Shirakawa | |
| 2012/0243732 A1 | 9/2012 | Swaminathan et al. | |
| 2012/0300020 A1* | 11/2012 | Arth | G06T 7/0046 348/36 |
| 2014/0320593 A1* | 10/2014 | Pirchheim | G06T 7/0071 348/36 |

FOREIGN PATENT DOCUMENTS

| | | |
|---|---|---|
| JP | 2001160070 A | 6/2001 |
| JP | 2003266349 A | 9/2003 |
| JP | 2006293912 A | 10/2006 |
| JP | 2009064445 A | 3/2009 |
| JP | 2009509218 A | 3/2009 |
| JP | 2009301197 A | 12/2009 |
| JP | 2010118019 A | 5/2010 |
| WO | WO-2007026162 A2 | 3/2007 |

OTHER PUBLICATIONS

Gammeter S., et al., "Server-side Object Recognition and Client-side Object Tracking for Mobile Augmented Reality," 2010 IEEE Computer Society Conference on Computer Vision and Pattern Recognition Workshops, IEEE, Piscataway, NJ, USA, Jun. 13, 2010 (Jun. 13, 2010), pp. 1-8, XP031728435, ISBN: 978-1-4244-7029-7.
Gausemeier J et al: "Development of a real time image based object recognition method for mobile AR-devices", Proceedings of the 2nd International Conference on Computer Graphics, VIrtual Reality, Visualisation and Interaction in Africa. Session: Session G: Image-Based Methods, Cape Town, South Africa, [Online] pp. 133-139, XP002488965.
Ha J., et al., "Real-time Scalable Recognition and Tracking based on the Server-client Model for Mobile Augmented Reality," VR Innovation (ISVRI), 2011 IEEE International Symposium on, IEEE, Mar. 19, 2011 (Mar. 19, 2011), pp. 267-272, XP031861061, DOI: 10.1109/ISVRI.2011.5759649.
International Preliminary Report on Patentability—PCT/US2011/052135—The International Bureau of WIPO Geneva, Switzerland, Apr. 4, 3013.
International Search Report and Written Opinion—PCT/US2011/052135—ISA/EPO—Dec. 22, 2011.
Kurata T., et al., "VizWear: Human-Centered Interaction through Computer Vision and Wearable Display", Technical Report of the Institute of Image Information and Television Engineers, Japan, ITE, Nov. 20, 2001, vol. 25, No. 76, p. 47-52.
Papagiannakis G et al: "A survey of mobile and wireless technologies for augmented reality systems", Computer Animation and Virtual Worlds, John Wiley & Sons LTD, GB, vol. 19, No. 1, Feb. 1, 2008 (Feb. 1, 2008), pp. 3-22, XP002569031.
Pirchheim C., et al., "Nomography-based planar mapping and tracking for mobile phones," Mixed and Augmented Reality (ISMAR), 2011 10th IEEE International Symposium on IEEE, Oct. 26, 2011 (Oct. 26, 2011), pp. 27-36.
Sunju-Youm, et al., "Dynamic threshold method for scene change detection," 2003 International Conference on Multimedia and Expo, 2003. ICME '03 Proceedings. pp. II 337-II 340, vol. 2.
Takacs G et al: "Outdoors augmented reality on mobile phone using loxel-based visual feature organization" Proceedings of the Workshop on Multimedia Information Retrieval(M1RO), XX, Vancouver, B.C., Canada, Oct. 27, 2008 (Oct. 27, 2008), pp. 427-434, XP007915264, DOI:10.1145/1460096.1460165.
Xiong, et al., "Efficient scene change detection and camera motion annotation for video classification," Computer Vision and Image Understanding, vol. 71, No. 2, Aug. 1998, pp. 166-181, Article No. IV980711.
Zhang, et al., "Automatic Partitioning of Full-motion video," Multimedia Systems, vol. 1, Issue, 1, 1993, pp. 10-28.

* cited by examiner

ADAPTABLE FRAMEWORK FOR CLOUD ASSISTED AUGMENTED REALITY

CROSS-REFERENCE TO RELATED APPLICATION(S)

This application is a continuation of co-pending U.S. application Ser. No. 13/235,847, filed Sep. 19, 2011, entitled "An Adaptable Framework For Cloud Assisted Augmented Reality," which claims under 35 USC §119 the benefit of and priority to U.S. Provisional Application No. 61/384,667, filed Sep. 20, 2010, and entitled "An Adaptable Framework For Cloud Assisted Augmented Reality" both of which are assigned to the assignee hereof and are incorporated herein by reference.

BACKGROUND

An augmented reality system can insert virtual objects in a user's view of the real world. There may be many components in a typical AR system. These include: data acquisition, data processing, object detection, object tracking, registration, refinement, and rendering components. These components may interact with each other to provide the user a rich AR experience. Several components in detection and tracking in a typical AR system, however, may utilize computationally intensive operations, which can disrupt the AR experience for the user.

SUMMARY

A mobile platform efficiently processes sensor data, including image data, using distributed processing in which latency sensitive operations are performed on the mobile platform, while latency insensitive, but computationally intensive operations are performed on a remote server. The mobile platform acquires sensor data, such as image data and determines whether there is a trigger event to transmit the sensor data to the server. The trigger event is a change in the sensor data relative to previously acquired sensor data, e.g., a scene change in the captured image. When a change is present, the sensor data is transmitted to the server for processing. The server processes the sensor data and returns information related to the sensor data, such as identification of an object in an image. The mobile platform may then perform reference based tracking using the identified object.

In one implementation a method includes acquiring image data using a mobile platform, wherein the image data is from at least one captured image of an object; tracking the object with visual based tracking using the at least one captured image of the object; determining whether there is a trigger event comprising a change in the image data relative to previously acquired image data, wherein the trigger event comprises a scene change in which a different object appears in the at least one captured image with respect to a previous captured image; transmitting the image data to a server when there is the trigger event while continuing to track the object with visual based tracking using the at least one captured image of the object; and receiving information related to the image data from the server, wherein the information related to the image data comprises at least one of the following: a two dimensional (2D) model of the object, a three dimensional (3D) model of the object, a three-dimensional coordinate estimation of points on the object, augmentation information, saliency information about the object, and information related to object matching.

In one implementation, a mobile platform includes a sensor adapted to acquire image data, wherein the sensor is a camera and the image data is from at least one captured image of an object; a wireless transceiver; and a processor coupled to the sensor and the wireless transceiver, the processor adapted to acquire the image data via the sensor, to track the object with visual based tracking using the at least one captured image of the object, to determine whether there is a trigger event comprising a change in the image data relative to previously acquired image data, wherein the trigger event comprises a scene change in which a different object appears in the at least one captured image with respect to a previous captured image, to transmit via the wireless transceiver the image data to an external processor when the trigger event is present while continuing to track the object with visual based tracking using the at least one captured image of the object, and to receive information related to the image data from the external processor via the wireless transceiver, wherein the information related to the image data comprises at least one of the following: a two dimensional (2D) model of the object, a three dimensional (3D) model of the object, a three-dimensional coordinate estimation of points on the object, augmentation information, saliency information about the object, and information related to object matching.

In one implementation, a mobile platform includes means for acquiring image data, wherein the means for acquiring image data is a camera and the image data is from at least one captured image of an object; means for tracking the object with visual based tracking using the at least one captured image of the object; means for determining whether there is a trigger event comprising a change in the image data relative to previously acquired image data, wherein the trigger event comprises a scene change in which a different object appears in the at least one captured image with respect to a previous captured image; means for transmitting the image data to a server when there is the trigger event while continuing to track the object with visual based tracking using the at least one captured image of the object; and means for receiving information related to the image data from the server, wherein the information related to the image data comprises at least one of the following: a two dimensional (2D) model of the object, a three dimensional (3D) model of the object, a three-dimensional coordinate estimation of points on the object, augmentation information, saliency information about the object, and information related to object matching.

In one implementation, a non-transitory computer-readable medium including program code stored thereon includes program code to acquire image data, wherein the image data is from at least one captured image of an object; program code to track the object with visual based tracking using the at least one captured image of the object; program code to determine whether there is a trigger event comprising a change in the image data relative to previously acquired image data, wherein the trigger event comprises a scene change in which a different object appears in the at least one captured image with respect to a previous captured image; program code to transmit the image data to an external processor when the trigger event is present while continuing to track the object with visual based tracking using the at least one captured image of the object, and program code to receive information related to the image data from the external processor, wherein the information related to the image data comprises at least one of the following: a two dimensional (2D) model of the object, a three dimensional (3D) model of the object, a three-dimensional coordinate estimation of points on the object, augmentation information, saliency information about the object, and information related to object matching.

DETAILED DESCRIPTION

A distributed processing system, as disclosed herein, includes a device that may determine when to provide data to a server via a wireless network, or to another device via network in a cloud computing environment, to be processed. The device may also process the data itself. For example, latency sensitive operations may be chosen to be performed on the device and latency insensitive operations may be chosen to be performed remotely for more efficient processing. Factors for determining when to send data to the server to be processed may include whether operations being performed on the data are latency sensitive/insensitive, an amount of computation required, processor speed/availability at either the device or the server, network conditions, or quality of service, among other factors.

In one embodiment, a system including a mobile platform and an external server is provided for Augmented Reality (AR) applications, in which latency sensitive operations are performed on the mobile platform, while latency insensitive, but computationally intensive operations are performed remotely, e.g., on the server, for efficient processing. The results may then be sent by the server to the mobile platform. Using distributed processing for AR applications, the end-user can seamlessly enjoy the AR experience.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of AR.

Figure 1:
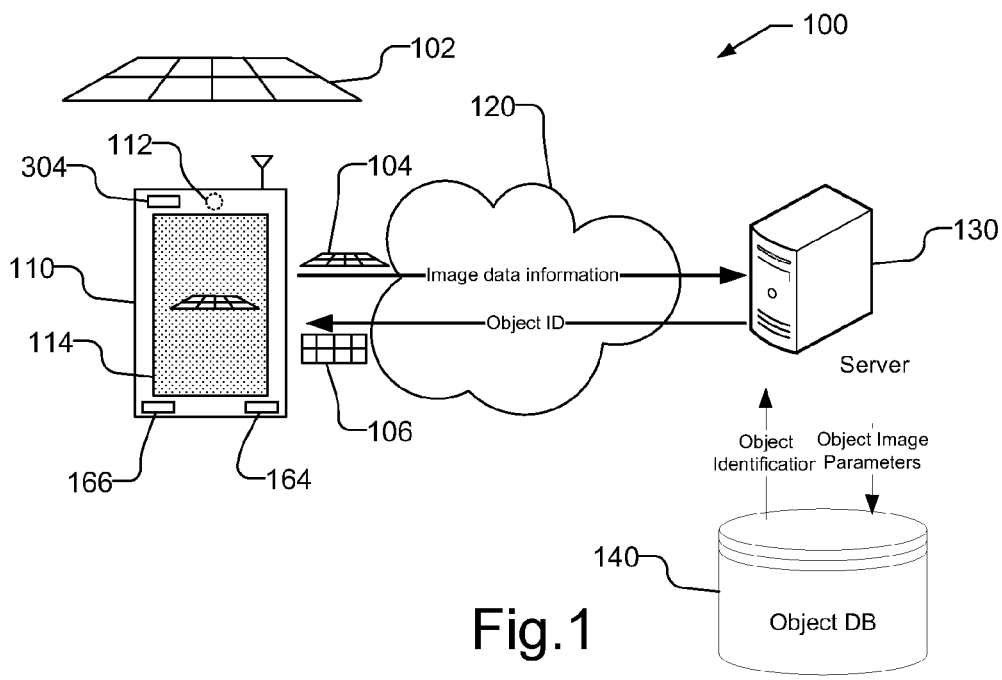
FIG. 1 illustrates a block diagram showing a system for distributed processing including a mobile platform and a remote server.

FIG. 1 illustrates a block diagram showing a system 100 for distributed processing using server based object detection and identification. System 100 includes a mobile platform 110 that performs latency sensitive operations, such as tracking, while a remote server 130 performs latency insensitive and computationally intensive operations, such as object identification. The mobile platform may include a camera 112 and a display 114 and/or may include motion sensors 164. The mobile platform 110 may acquire an image 104 of an object 102, which may be shown on the display 114. The image 104 captured by the mobile platform 110 may be a static image, e.g., a photograph, or a single frame from a video stream, both of which are referred to herein as a captured image. The mobile platform 110 may additionally or alternatively acquire other sensor data, including position and/or orientation data, from a sensor other than the camera 112, for example using a satellite positioning system (SPS) receiver 166 or one or more motion sensors 164 including, e.g., accelerometers, gyroscopes, electronic compass, or other similar motion sensing elements. An SPS may be a constellation of Global Navigation Satellite System (GNSS) such as Global Positioning System (GPS), Galileo, Glonass or Compass, or other various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems.

The mobile platform 110 transmits the acquired data information, such as the captured image 104 and/or the sensor data, such as SPS information or position information from on-board motion sensors 164, to the server 130 via a network 120. The acquired data information may also or alternatively include contextual data, such as the identification of any objects that are currently being tracked by the mobile platform 110. The network 120 may be any wireless communication networks such as a wireless wide area network (WWAN), a wireless local area network (WLAN), a wireless personal area network (WPAN), and so on. The server 130 processes the data information provided by the mobile platform 110 and generates information related to the data information. For example, the server 130 may perform object detection and identification based on provided image data using an object database 140. The server 130 returns to the mobile platform 110 information that is related to the acquired data. For example, if the server 130 identifies an object from image data provided by the mobile platform 110, the server 130 may return an identification of the object, for example, including an identifier such as a title or identifying number or a reference image 106 of the object 102, as well as any desired side information, such as saliency indicators, information links, etc., that may be used by the mobile platform for the augmented reality application.

If desired, the server 130 may determine and provide to the mobile platform 110 a pose (position and orientation) of the mobile platform 110 at the time image 104 was captured relative to the object 102 in the reference image 106, which is, e.g., an image of the object 102 from a known position and orientation. The returned pose can be used to bootstrap the tracking system in the mobile platform 110. In other words, the mobile platform 110 may track all incremental changes in its pose, e.g., visually or using motion sensors 164, from the time it captures the image 104 to the time it receives the reference image 106 and pose from the server 130. The mobile platform 110 may then use the received pose along with its tracked incremental changes in pose to quickly determine the current pose with respect to the object 102.

In another embodiment, the server 130 returns the reference image 106, but does not provide pose information, and the mobile platform 110 determines a current pose with respect to the object 102 by comparing a current captured image of the object 102 with respect to the reference image 106 of the object 102 using an object detection algorithm. The pose may be used as an input to the tracking system so that relative motion can be estimated.

In yet another embodiment, the server 130 returns only the pose information but does not provide the reference image. In this case, the mobile platform 110 may use the captured image 104 along with the pose information to create a reference image which can subsequently be used by the tracking system. Alternatively, the mobile platform 110 may track incremental changes in position between the captured image 104 and a subsequently captured image (referred to as the current image) and may compute the pose of the current image relative to the mobile platform generated reference image using the pose obtained from the server 130 along with the incremental tracking results. In the absence of the reference image 102, the current image may be warped (or rectified) using the estimated pose to obtain an estimate of the reference image which may be used to bootstrap the tracking system.

Additionally, in order to minimize the frequency of detection requests sent by the mobile platform 110 to the server 130, the mobile platform 110 may initiate a detection request only if a trigger event is present. A trigger event may be based on a change in the image data or the sensor data from motion sensors 164 relative to previously acquired image data or sensor data. For example, the mobile platform 110 may use a scene change detector 304 to determine if a change in the image data has occurred. Thus, in some embodiments, the mobile platform 110 may communicate with the server 130 via network for detection requests only when triggered by the scene change detector 304. The scene change detector 304 triggers communication with the server for object detection, e.g., only when new information is present in the current image.

Figure 2:
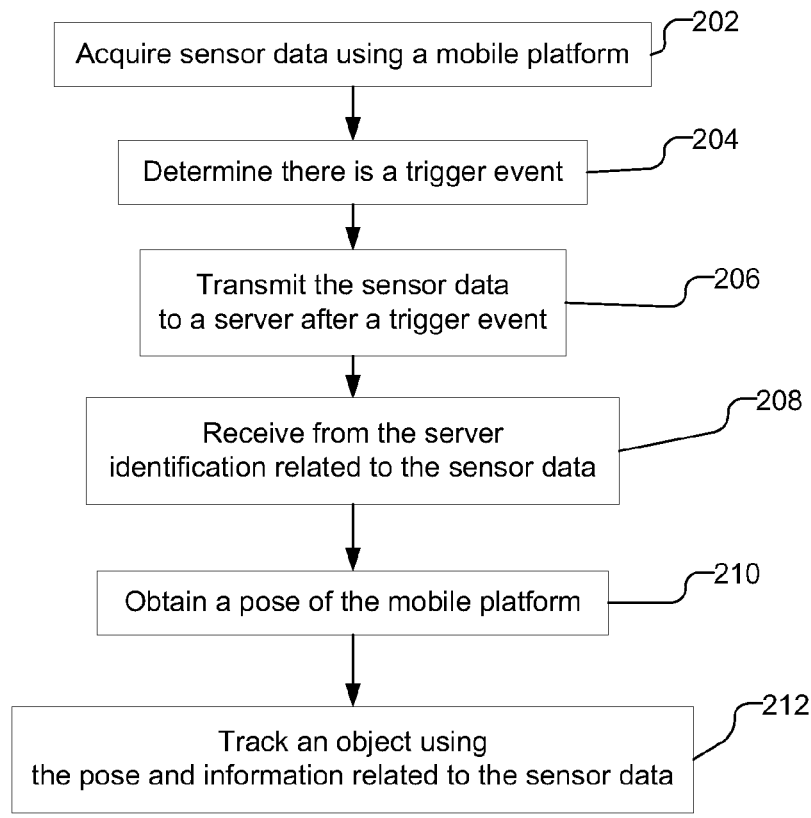
FIG. 2 is a flow chart illustrating a process of distributed processing with latency sensitive operations performed by the mobile platform and latency insensitive and computationally intensive operations performed by an external processor.

FIG. 2 is a flow chart illustrating a process of distributed processing with latency sensitive operations performed by the mobile platform 110 and latency insensitive and computationally intensive operations performed by an external processor, such as server 130. As illustrated, sensor data is acquired by the mobile platform 110 (202). The sensor data may be an acquired image, e.g., a captured photo or frame of video, or information derived therefrom, including character recognition or extracted keypoints. The sensor data may also or alternatively include, e.g., SPS information, motion sensor information, barcode recognition, text detection results, or other results from partially processing the image, as well as contextual information, such as user behavior, user preferences, location, user information or data (e.g., social network information about the user), time of day, quality of lighting (natural vs. artificial), and people standing nearby (in the image), etc.

The mobile platform 110 determines that there is a trigger event (204), such as a change in the sensor data relative to previously acquired sensor data. For example, the trigger event may be a scene change in which a new or different object appears in the image. The acquired sensor data is transmitted to the server 130 after a trigger event, such as a scene change, is detected (206). Of course, if no scene change is detected, the sensor data need not be transmitted to the server 130 thereby reducing communications and detection requests.

The server 130 processes the acquired information, e.g., to perform object recognition, which is well known in the art. After the server 130 processes the information, the mobile platform 110 receives from the server 130 information related to the sensor data (208). For example, the mobile platform 110 may receive results of the object identification, including, e.g., a reference image. The information related to the sensor data may additionally or alternatively include information such as items that are located near the mobile platform 110 (such as buildings, restaurants, available products in a store, etc.) as well as two-dimensional (2D) or three-dimensional (3D) models from the server, or information that may be used in other processes such as gaming. If desired, additional information may be provided, including the pose of the mobile platform 110 with respect to the object in the reference image at the time that the image 104 was captured, as discussed above. If the mobile platform 110 includes a local cache, then the mobile platform 110 may store multiple reference images sent by the server 130. These stored reference images can be used, e.g., for subsequent re-detections that can be performed in the mobile platform 110 if tracking is lost. In some embodiments, the server identifies a plurality of objects from the sensor in the image. In such embodiments, a reference image or other object identifier may be sent to the mobile platform 110 for only one of the identified objects, or a plurality of object identifiers corresponding to respective objects may be transmitted to and received by the mobile platform 110.

Thus, information that may be provided by the server 130 may include a recognition result, information about the object(s) identified, reference images (one or many) about the object(s) which can be used for various functions such as in tracking, 2D/3D model of the object(s) recognized, absolute pose of the recognized object(s), augmentation information to be used for display, and/or saliency information about the object. Additionally, the server 130 may send information related to object matching that could enhance the classifier at the mobile platform 110. One possible example is when the mobile platform 110 is using decision trees for matching. In this case, the server 130 could send the values for the individual nodes of the tree to facilitate more accurate tree building and subsequently better matching. Examples of decision trees include, e.g., k-means, k-d trees, vocabulary trees, and other trees. In the case of a k-means tree, the server 130 may also send the seed to initialize the hierarchical k-means tree structure on the mobile platform 110, thereby permitting the mobile platform 110 to perform a look-up for loading the appropriate tree.

Optionally, the mobile platform 110 may obtain a pose for the mobile platform with respect to the object 102 (210). For example, the mobile platform 110 may obtain the pose relative to the object in the reference image without receiving any pose information from the server 130 by capturing another image of the object 102 and comparing the newly captured image with the reference image. Where the server 130 provides pose information, the mobile platform may quickly determine a current pose, by combining the pose provided by the server 130, which is the pose of the mobile platform 110 relative to the object in the reference image at the time that the initial image 104 was captured, with tracked changes in the pose of the mobile platform 110 since the initial image 104 was captured. It is to be noted that whether the pose is obtained with or without the assistance of the server 130 may depend on the capabilities of the network 120 and/or the mobile platform 110. For example, if the server 130 supports pose estimation and if the mobile platform 110 and the server 130 agree upon an application programming interface (API) for transmitting the pose, the pose information may be transmitted to the mobile platform 110 and used for tracking. The pose of the object 102 (210) sent by the server may be in the form of relative rotation and transformation matrices, a homography matrix, an affine transformation matrix, or another form.

Optionally, the mobile platform 110 may then perform AR with the object, using the data received from the server 130, such as tracking the target, estimating the object pose in each frame, and inserting a virtual object or otherwise augmenting a user view or image through the rendering engine using the estimated pose (212).

Figure 3:
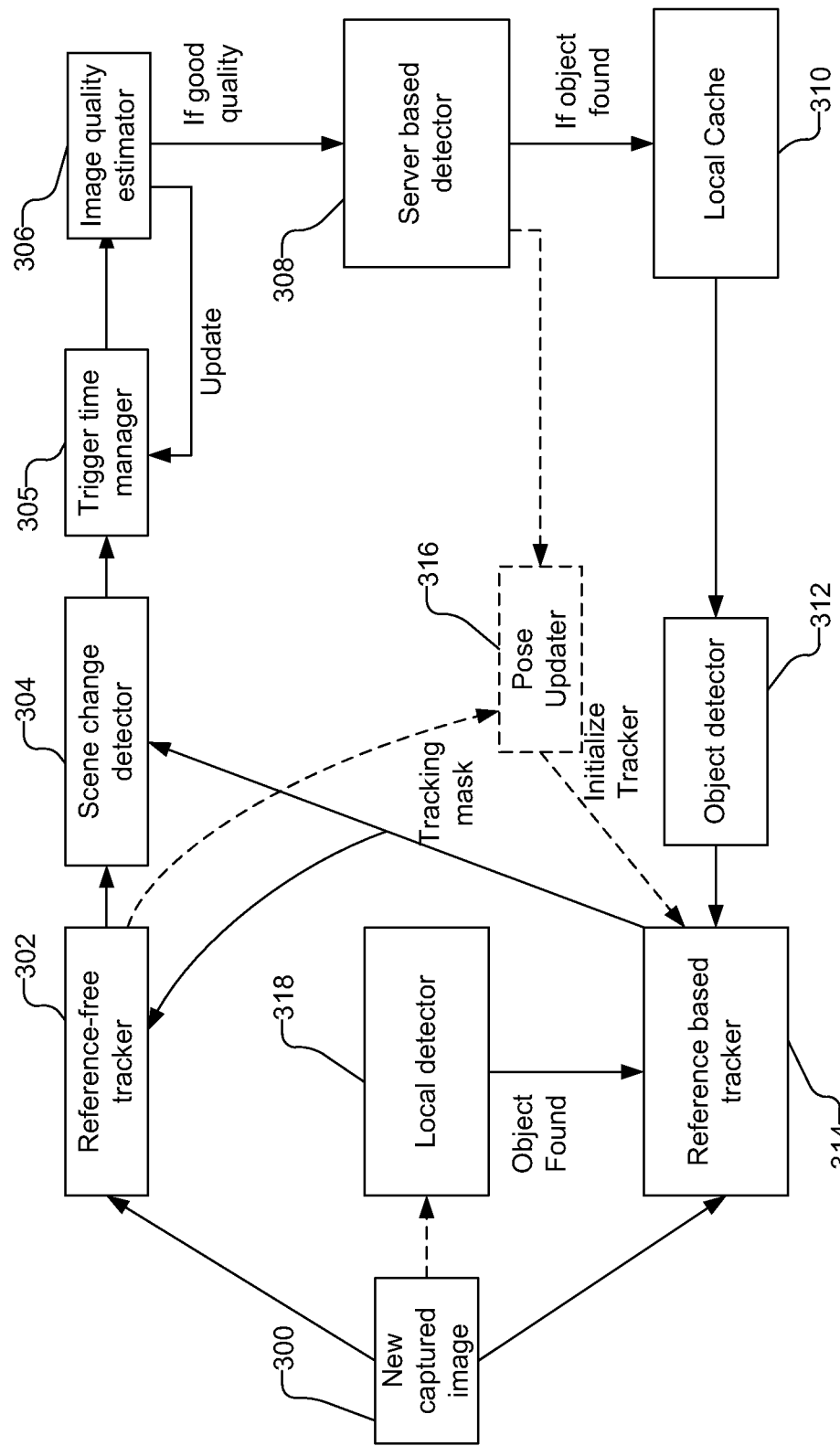
FIG. 3 illustrates a block diagram of the operation of a system for server assisted AR.

FIG. 3 illustrates a block diagram of the operation of system 100 for server 130 assisted AR. As shown in FIG. 3, a new captured image 300 is used to initiate a reference-free tracker 302. The reference-free tracker 302 performs tracking based on optical flow, normalized cross correlations (NCC) or any similar methods, known in the art. The reference-free tracker 302 identifies features, such as points, lines, regions and the like, in the new captured image 300 and tracks these features from frame to frame, e.g., using flow vectors. The flow vectors obtained from the tracking results help estimate the relative motion between a previous captured image and a current captured image and in turn helps identify the speed of motion. Information provided by the reference-free tracker 302 is received by the scene change detector 304. The scene change detector 304 uses, e.g., tracked features from the reference-free tracker 302, along with other types of image statistics (such as histogram statistics) and other available information from the sensors in the mobile platform to estimate change in the scene. If no trigger is sent by the scene change detector 304, the process continues with the reference-free tracker 302. If the scene change detector 304 identifies a substantial change in the scene, the scene change detector 304 sends a trigger signal that may initiate the detection process in the server based detector 308. If desired, an image quality estimator 306 may be used to analyze the image quality to further control the transmission of requests to the server based detector 308. The image quality estimator 306 examines the quality of the image and if the quality is good, i.e., greater than a threshold, a detection request is triggered. If the image quality is poor, no detection is triggered and the image is not transmitted to the server based detector 308. In one embodiment of the invention, the mobile platform 110 may wait for a good quality image for a finite period of time after a scene change has been detected before sending the good quality image to the server 130 for object recognition.

The quality of the image may be based on known image statistics, image quality measures, and other similar approaches. For example, the degree of sharpness of a captured image may be quantified by high pass filtering and generating a set of statistics representing, e.g., edge strengths and spatial distribution. The image may be classified as a good quality image if the sharpness value exceeds or is comparable to the "prevailing sharpness" of the scene, e.g., as averaged over several previous frames. In another implementation, a quick corner detection algorithm such as FAST (Features from Accelerated Segment Test) corners or Harris corners may be used to analyze the image. The image may be classified as a good quality image if there are a sufficient number of corners, e.g., the number of detected corners exceeds a threshold or is greater or comparable to the "prevailing number of corners" of the scene, e.g., as averaged over several previous frames. In another implementation, statistics from the image, such as the mean or standard deviation of the edge gradient magnitudes, may be used to inform a learning classifier, which may be used to distinguish between good quality and bad quality images.

The quality of the image may also be measured using sensor inputs. For example, images captured by the mobile platform 110 while moving quickly may be blurred and therefore of poorer quality than if the mobile platform 110 was static or moving slowly. Accordingly, motion estimates from sensor data, e.g., from motion sensors 164 or from visual based tracking, may be compared to a threshold to determine if resultant camera images are of sufficient quality to be sent for object detection. Similarly, the image quality may be measured based on a determined amount of image blur.

Additionally, a trigger time manager 305 may be provided to further control the number of requests transmitted to the server based detector 308. The trigger time manager 305 maintains the state of the system and may be based on heuristics and rules. For example, if the number of images from the last trigger image is greater than a threshold, e.g., 1000 images, the trigger time manager 305 may generate a trigger that may time-out and automatically initiate the detection process in the server based detector 308. Thus, if there has been no trigger for an extended number of images, the trigger time manager 305 may force a trigger, which is useful to determine if any additional objects are in the camera's field of view. Additionally, the trigger time manager 305 may be programmed to maintain a minimum separation between two triggers at a chosen value of $\eta$, i.e., the trigger time manager 305 suppresses triggers if it is within $\eta$ images from the last triggered image. Separating triggered images may be useful, for example, if the scene is changing fast. Thus, if the scene change detector 304 produces more than one trigger within $\eta$ images, only one triggered image is sent to the server based detector 308, thereby reducing the amount of communication to the server 130 from the mobile platform 110. The trigger time manager 305 may also manage trigger schedules. For example, if the scene change detector 304 produces a new trigger that is less than $\eta$ images and greater than $\mu$ images ago from the last trigger, the new trigger may be stored and postponed by the trigger time manager 305 until a time when the image gap between consecutive triggers is at least $\eta$. By way of example, $\mu$ may be 2 images and $\eta \geq \mu$, and by way of example, $\eta$ may vary as 2, 4, 8, 16, 32, 64.

The trigger time manager 305 may also manage detection failures of the server 130. For example, if a previous server based detection attempt failed, the trigger time manager 305 may periodically produce a trigger to re-transmit a request to the server based detector 308. Each of these attempts may use a different query image based on the most recent captured image. For example, after a detection failure, a periodic trigger may be produced by the trigger time manager 305 with a period gap of η, e.g., if the last failed detection attempt was longer ago than η images ago, then a trigger is sent, where the value of η may be variable.

When the server based detector 308 is initiated, the server 130 is provided with the data associated with the new captured image 300, which may include the new captured image 300 itself, information about the new captured image 300, as well as sensor data associated with the new captured image 300. If an object is identified by the server based detector 308, the found object, e.g., a reference image, a 3D model of the object, or other relevant information is provided to the mobile platform 110, which updates its local cache 310. If no object is found by the server based detector 308 the process may fall back to periodic triggering, e.g., using the trigger time manager 305. If there is no object detected after Γ attempts, e.g., 4 attempts, the object is considered to not be in the database and the system resets to scene change detector based triggers.

With the found object stored in local cache 310, an object detector 312 running on the mobile platform 110 performs an object detection process to identify the object in the current camera view and the pose with respect to the object and sends the object identity and pose to the reference based tracker 314. The pose and the object identity sent by the object detector 312 may be used to initialize and to start the reference based tracker 314. In each subsequently captured image (e.g., frame of video), the reference-based tracker 314 may provide the pose with respect to the object to a rendering engine in the mobile platform 110 which places desired augmentation on top of the displayed object or otherwise within an image. In one implementation, the server based detector 308 may send a 3D model of the object, instead of a reference image. In such cases, the 3D model is stored in the local cache 310 and subsequently used as an input to the reference based tracker 314. After the reference based tracker 314 is initialized, the reference based tracker 314 receives each new captured image 300 and identifies the location of the tracked object in each new captured image 300 thereby permitting augmented data to be displayed with respect to the tracked object. The reference based tracker 314 may be used for many applications, such as pose estimations, face recognition, building recognition, or other applications.

Additionally, after the reference based tracker 314 is initialized, the reference based tracker 314 identifies regions of each new captured image 300 where the identified object is present and this information stored by means for a tracking mask. Thus, regions in new camera images 300 for which the system has complete information are identified and provided as an input to the reference-free tracker 302 and the scene change detector 304. The reference-free tracker 302 and scene change detector 304 continue to receive each new captured image 300 and use the tracking mask to operate on remaining regions of each new captured image 300, i.e., regions in which there is not complete information. Using the tracking mask as feedback not only helps reduce mis-triggers from the scene change detector 304 due to tracked objects, but also helps reduce the computational complexity of the reference-free tracker 302 and the scene change detector 304.

In one embodiment, illustrated by dotted lines in FIG. 3, the server based detector 308 may additionally provide pose information for an object in the new captured image 300 with respect to the object in the reference image. The pose information provided by the server based detector 308 may be used along with changes in the pose, as determined by the reference-free tracker 302, by a pose updater 316 to produce an updated pose. The updated pose may then be provided to the reference based tracker 314.

Additionally, when tracking is temporarily lost, subsequent re-detections may be performed using a local detector 318 searching the local cache 310. While FIG. 3 illustrates the local detector 318 and object detector 312 separately for clarity, if desired, the local detector 318 may implement the object detector 312, i.e., object detector 312 may perform the re-detections. If the object is found in local cache, the object identity is used to re-initialize and to start the reference based tracker 314.

Figure 4:
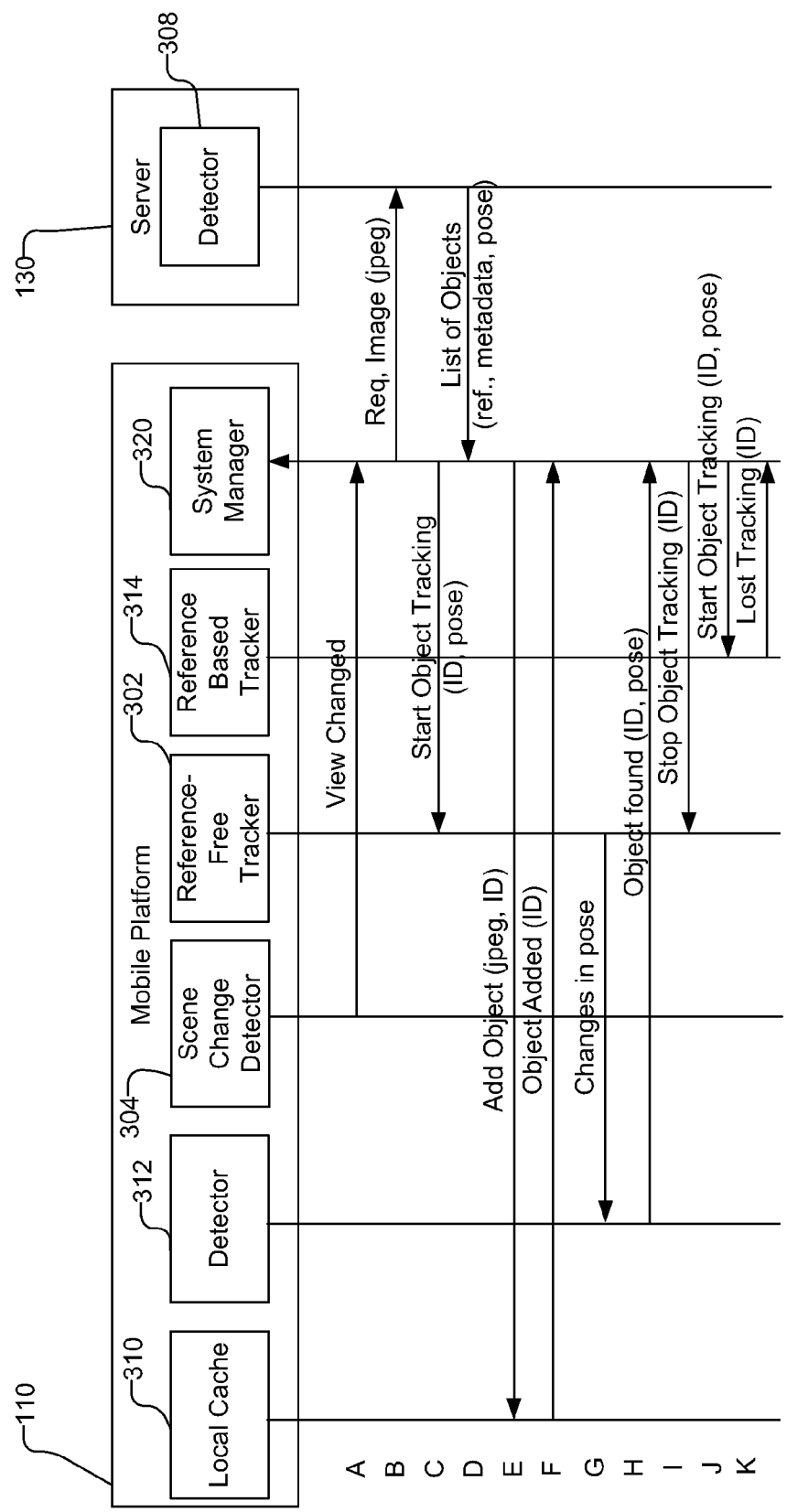
FIG. 4 illustrates a call flow diagram for server assisted AR, in which the pose is provided by the remote server.

FIG. 4 illustrates a call flow diagram for server assisted AR, in which the pose is provided by the server 130, as illustrated by broken lines and pose updater 316 in FIG. 3. When the scene change detector 304 indicates that a view has changed (step A), the server based detection process is initiated by the system manager 320 providing the server based detector 308 with, e.g., the new image, which may be in jpeg or other format, and a request for object detection (step B). Additional or alternative information may also be sent to the detector 308, such as sensor data that includes information related to the image, information from sensors such as SPS, orientation sensor reading, Gyro, Compass, pressure sensor, altimeter, etc., as well as user data, e.g., application usage data, user's profiles, social network information, past searches, location/sensor information, etc. . . . . The system manager 320 also sends a command to the reference free tracker 302 to track the object (step C). The detector 308 processes the data and returns to the system manager 320 a list of object(s), such as reference images for the object(s), features such as SIFT features, lines with descriptors, etc. . . . , metadata (such as for augmentation), and the pose back to the AR application (step D). The reference image for the object is added to the local cache 310 (step E), which acknowledges adding the object (step F). The reference free tracker 302 provides changes in the pose between the initial image and the current image to the detector 312 (step G). Detector 312 uses the reference image to find the object in the currently captured image, providing the object ID to the system manager 320 (step H). Additionally, the pose provided by the server based detector 308 is used by the detector 312 along with changes in the pose from the reference free tracker 302 to generate a current pose, which is also provided to the system manager 320 (step H). The system manager 320 instructs the reference-free tracker 302 to stop object tracking (step I) and instructs the reference based tracker 314 to start object tracking (step J). Tracking continues with the reference based tracker 314 until tracking is lost (step K).

Figure 5:
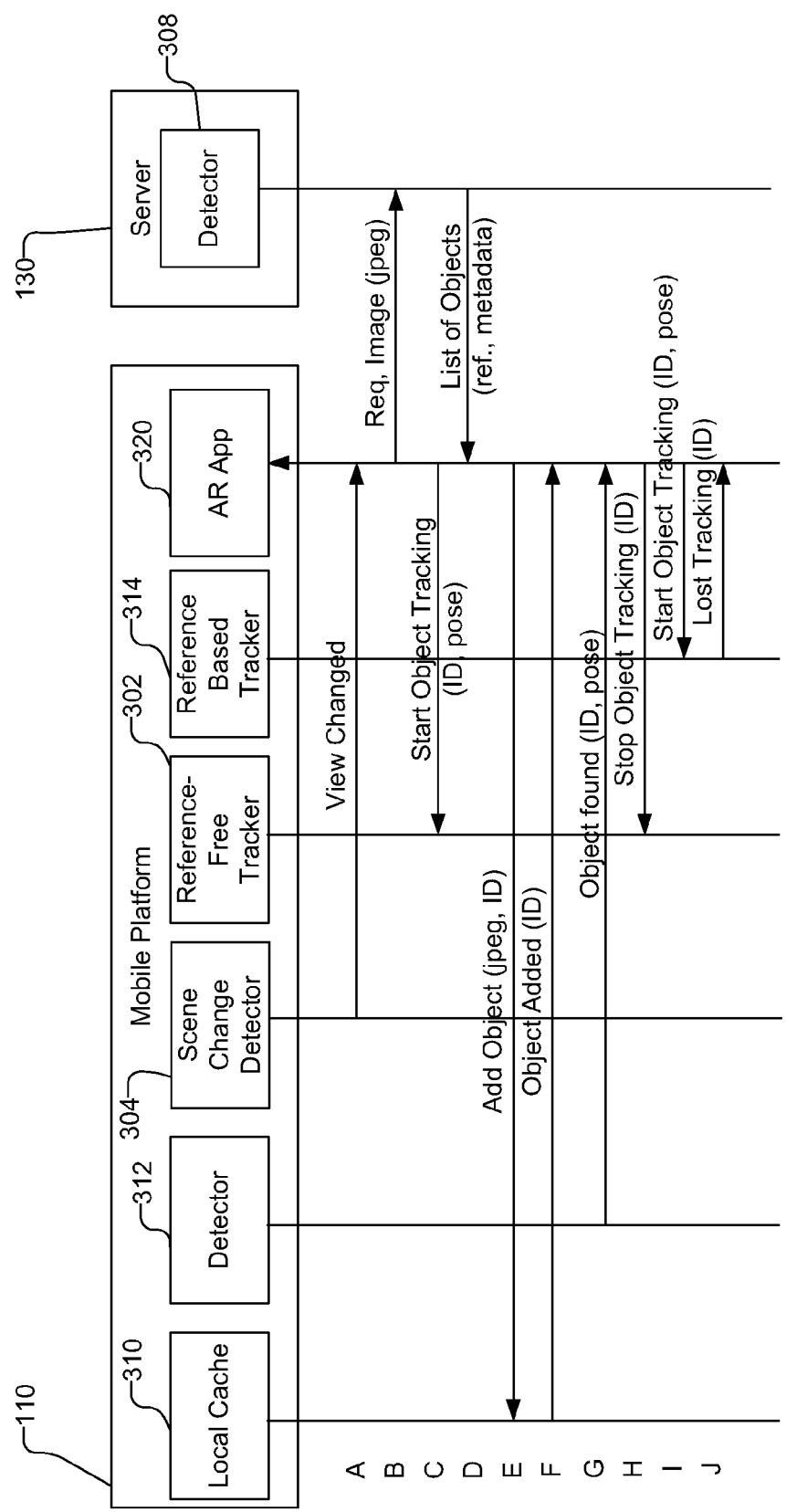
FIG. 5 illustrates another call flow diagram for server assisted AR, in which the pose is not provided by the remote server.

FIG. 5 illustrates another call flow diagram for server assisted AR, in which the pose is not provided by the server 130. The call flow is similar to that shown in FIG. 4, except that the detector 308 does not provide pose information to system manager 320 in step D. Thus, the detector 312 determines the pose based on the current image and the reference image provided by the detector 308 and provides that pose to the system manager 320 (step G).

As discussed above, the scene change detector 304 controls the frequency of detection requests sent to the server 130 based on changes in a current captured image with respect to previous captured images. The scene change detector 304 is used as it is desirable to communicate with the external server 130 to initiate object detection only when significant new information is present in the image.

Figure 6:
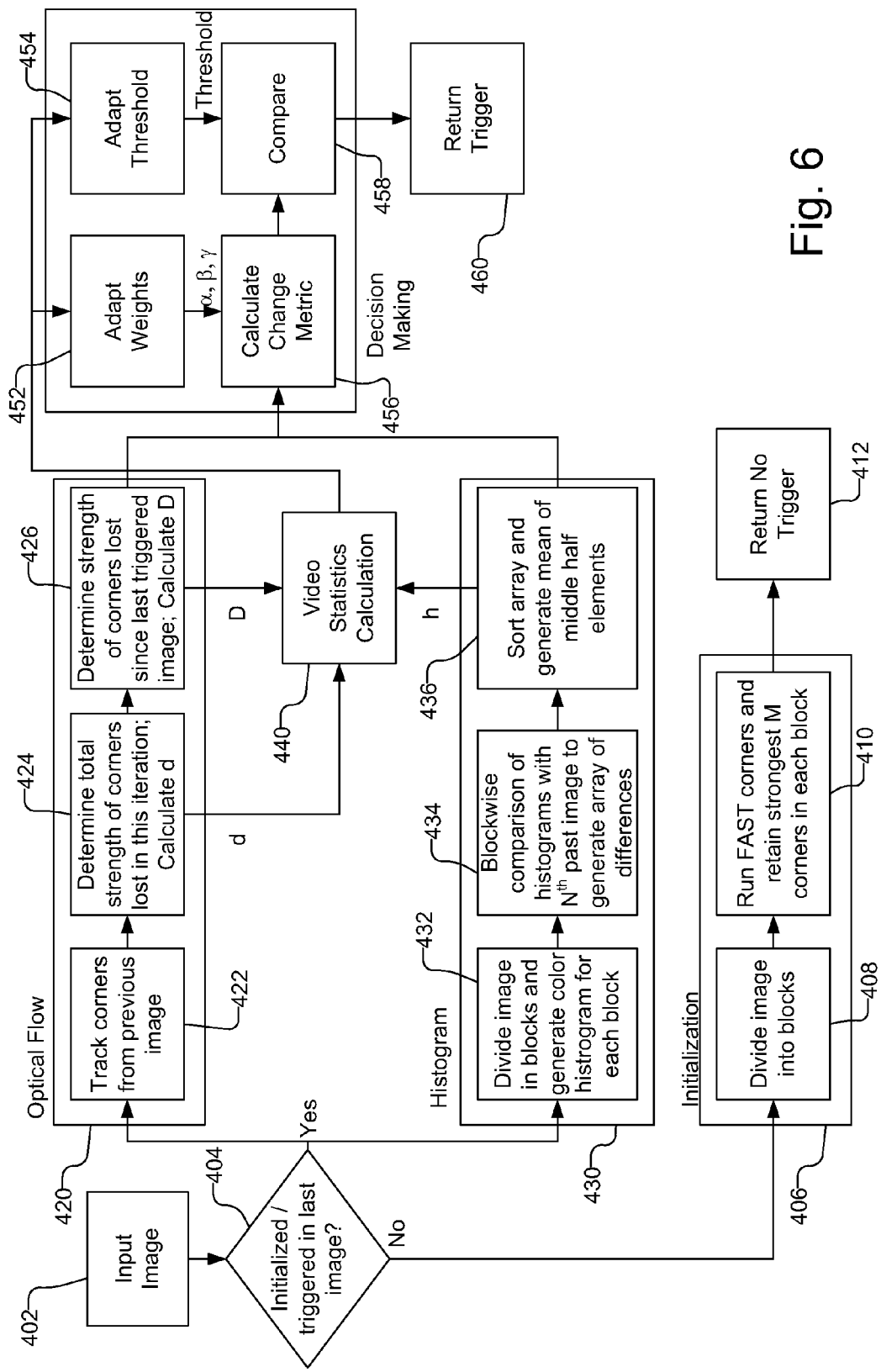
FIG. 6 illustrates a flow chart of the method performed by the scene change detector.

FIG. 6 illustrates a flow chart of the method performed by the scene change detector 304. The process for scene change detection is based on a combination of metrics from the reference-free tracker 302 (FIG. 3) and image pixel histograms. As discussed above, the reference-free tracker 302 uses an approach such as optical flow, normalized cross correlation and/or any such approaches that track relative motion between consecutive images, e.g., as point, line or region correspondence. A histogram based method may work well for certain use cases, such as book flipping, where there is significant change in the information content of the scene in a short time duration, and may therefore be beneficial for use in the scene detection process; a reference-free tracking process may efficiently detect changes for other use cases, such as panning, where there is a gradual change in the information content in the scene.

Thus, as illustrated in FIG. 6, an input image 402 is provided. The input image is the current captured image, which may be the current video frame or photo. If the last image did not trigger scene change detection (404), then initialization (406) of the scene change detector is performed (406). Initialization includes dividing the image into blocks (408), e.g., 8×8 blocks for a QVGA image, and extracting keypoints from each block using, e.g., a FAST (Features from Accelerated Segment Test) corner detector, in which the M strongest corners are retained (410), where M may be 2. Of course, other methods may alternatively be used for extracting keypoints, such as Harris corners, Scale Invariant Feature Transform (SIFT) feature points, Speeded-up Robust Features (SURF), or any other desired method. A no trigger signal is returned (412).

If the last image did trigger scene change detection (404), metrics are obtained from the reference-free tracker 302 (FIG. 3), illustrated as optical flow process 420, and image pixel histograms, illustrated as histogram process 430. If desired, the reference-free tracker 302 may produce metrics using processes other than optical flow, such as normalized cross-correlation. The optical flow process 420 tracks corners from a previous image (422), e.g., using normalized cross correlation, and identifies their locations in the current image. The corners may have been previously extracted by dividing the image into blocks and selecting keypoints from each block using, e.g., a FAST corner detector in which the M strongest corners based on the FAST corner threshold are retained, as discussed in the initialization 406 above, or in the case of Harris corners, M strongest corners based on the Hessian threshold are retained. Reference free tracking is run for the chosen corners over consecutive images to determine the location of corners in the current image and the corners that are lost in tracking. The total strength of corners lost in the current iteration (d in 424), i.e., between the current image a preceding image, is calculated as a first change metric and the total strength of corners lost since the previous trigger (D in 426), i.e., between the current image and the previous trigger image, is calculated as a second change metric, which are provided for a video statistics calculation 440. The histogram process 430 divides the current input image (referred to as C) into B×B blocks and generates a color histogram $H^C_{i,j}$ for each block (432), wherein i and j are the block indices in the image. A block-wise comparison of the histograms is performed (434) with corresponding block's histograms from the $N^{th}$ past image $H^N_{i,j}$ using, e.g., the Chi-Square method. The comparison of the histograms helps determine the similarity between the current image and the $N^{th}$ past image so as to identify if the scene has changed significantly. By means of an example, B can be chosen to be 10. To compare the histograms of the current image and the $N^{th}$ past image using the Chi-Square method, the following computation is performed:

$$f_{ij} = d(H^C_{i,j}, H^N_{i,j}) = \sum_{\forall k} \frac{(H^C_{i,j}(k) - H^N_{i,j}(k))^2}{H^C_{i,j}(k) + H^N_{i,j}(k)} \qquad \text{eq. 1}$$

The block-wise comparison produces an array $f_{ij}$ of difference values. The array $f_{ij}$ is sorted and a histogram change metric h is determined, e.g., as the mean of half the elements in the middle of the sorted array $f_{ij}$ (436). The histogram change metric h is also provided for the video statistics calculation.

As discussed above, if desired, a tracking mask provided by the reference based tracker 314 (FIG. 3), may be used during scene change detection to reduce the regions of the input image to be monitored for scene change. The tracking mask identifies regions where an object is identified and therefore scene change monitoring may be omitted. Thus, for example, when the input image is divided into blocks, e.g., at 422, 432, the tracking mask may be used to identify blocks that fall within the regions with identified objects and, accordingly, those blocks may be ignored.

The video statistics calculation 440 receives the optical flow metrics d, D and the histogram change metric h and produces a determination of image quality, which is provided along with metrics d, D, and h to determine if detection should be triggered. A change metric Δ is calculated and compared (458) to a threshold to return a trigger signal (460). Of course, if the change metric Δ is less than the threshold, no trigger signal is returned. The change metric Δ may be calculated (456) based on the optical flow metrics d, D and the histogram change metric h, e.g., as follows:

$$\Delta = \alpha d + \beta D + \gamma h. \qquad \text{eq. 2}$$

Here α, β, and γ are weights that are appropriately chosen (452) to provide relative importance to the three statistics, d, D, and h. In one embodiment, the values of α, β, and γ may be set to a constant during the entire run. In an alternate embodiment, the values of α, β, and γ may be adapted depending on possible feedback received about the performance of the system or depending on the use-case targeted. For example, the value of α and β may be set relatively high compared to γ for applications involving panning type scene change detections because the statistics d and D may be more reliable in this case. Alternatively, the values of α and β may be set to be relatively low compared to γ for applications which primarily involve book flipping type of use cases where the histogram statistic h may be more informative. The threshold may be adapted (454) based on the output of the video statistics calculation 440, if desired.

In one case, if desired, the scene detection process may be based on metrics from the reference-free tracker 302, without metrics from histograms, e.g., the change metric Δ from equation 2 may be used with γ=0. In another implementation, the input image may be divided into blocks and keypoints extracted from each block using, e.g., a FAST (Features from Accelerated Segment Test) corner detector, in which the M strongest corners are retained, as discussed above. If a sufficient number of blocks have changed between the current image and the previous image, e.g., compared to a threshold, the scene is determined to have changed and a trigger signal is returned. A block may be considered changed, e.g., if the number of corners tracked is less than another threshold.

Moreover, if desired, the scene detection process may be based simply on the total strength of corners lost since the previous trigger (D in 426) relative to strength of the total number of corners in the image, e.g., the change metric $\Delta$ from equation 2 may be used with $\alpha=0$ and $\gamma=0$. The total strength of corners lost since the previous trigger may be determined as:

$$D_c = \sum_{i=t+1}^{c} \left( \sum_{j \in Li} s_j \right). \qquad \text{eq. 3}$$

In equation 3, $s_j$ is the strength of corner j, t is the last triggered image number, c is the current image number, and Li is the set containing identifiers of lost corners in frame i. If desired, a different change metric $\Delta$ may be used, such as:

$$\Delta = \frac{D_c}{\sum_{j=1}^{N_T} s_j} \qquad \text{eq. 4}$$

where $N_T$ is the total number of corners in the triggered image. The change metric $\Delta$ may be compared (458) to a threshold.

Additionally, as discussed above, the tracking mask may be used by the scene change detector 304 to limit the area of each image that is searched for changes in the scene. In other words, the loss of the strength of the corners outside of the area of the trigger mask is the relevant metric. A reduction in the size of the area searched by the scene change detector 304 leads to a corresponding reduction in the number of corners that can be expected to be detected. Thus, an additional parameter may be used to compensate for the loss of corners due to the tracking mask, e.g., as follows:

$$\lambda = \frac{\text{strength of corners in mask}}{\text{area of mask}} \qquad \text{eq. 5}$$

The compensating parameter $\lambda$ may be used to adjust the change metric $\Delta$. For example, if the scene detection process is based simply on the total strength of corners lost in the unmasked area since the previous trigger (D), the change metric $\Delta$ from equation 4 may be modified as:

$$\Delta = \frac{D_c + \lambda(A - A_c)}{\sum_{j=1}^{N_T} s_j} \qquad \text{eq. 6}$$

where $D_c$ is provided by equation 3 (with Li defined as the set containing identifiers of lost corners in the unmasked area in frame i), $A_c$ is the area of the mask for image c, and A is initialized to $A_{t+1}$.

Figure 7:
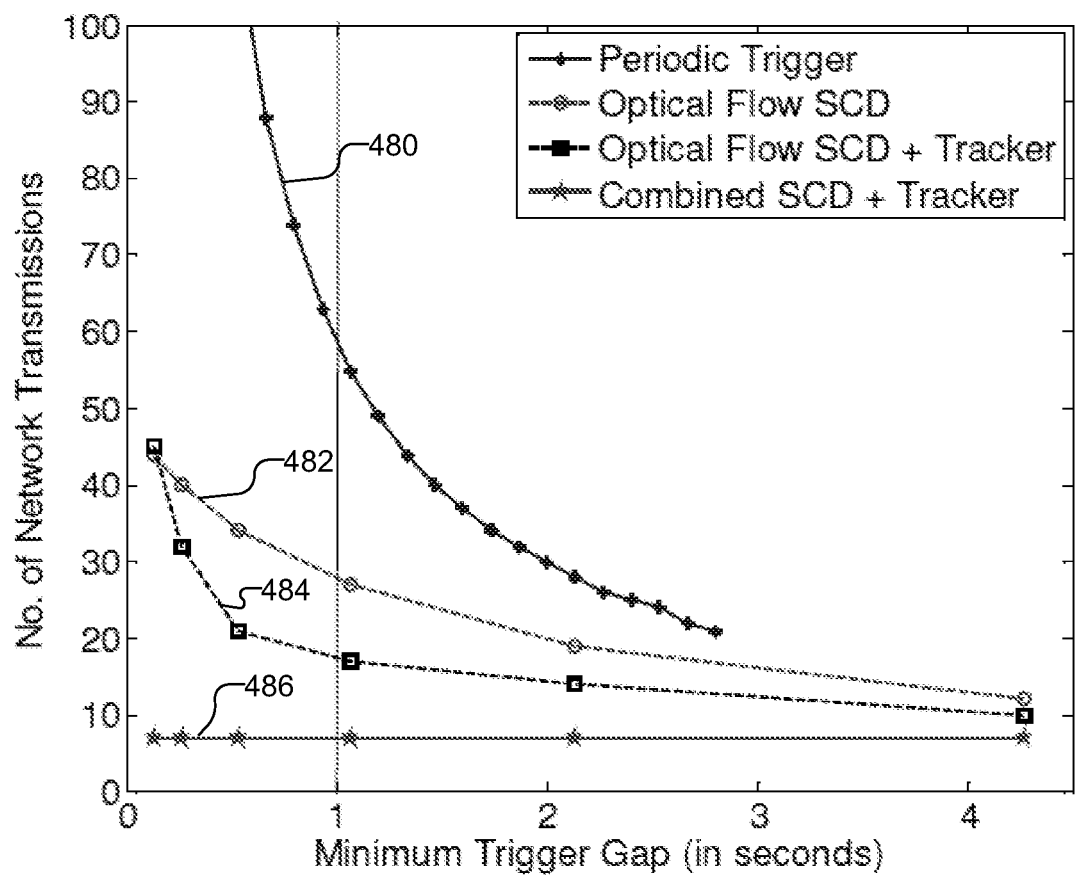
FIG. 7 is a chart illustrating performance of the distributed processing system showing required network transmissions as a function of the minimum trigger gap.

FIG. 7 is a chart illustrating performance of the system for a typical book-flipping use case in which five pages are turned in 50 seconds. FIG. 7 illustrates the number of required network transmissions to request object detections as a function of the minimum trigger gap in seconds. The lower the number of network transmissions required for the same minimum trigger gap implies better performance. Several curves are illustrated including curve 480 for a periodic trigger, curve 482 for a scene change detector (SCD) based on optical flow without histogram statistics ($\gamma=0$) and without the reference based tracker 314 (FIG. 3), curve 484 for the scene change detector (SCD) based on optical flow without histogram statistics ($\gamma=0$), but with the reference based tracker 314, and curve 486 for a combined optical flow and histogram based scene change detector (SCD) (as described in FIG. 6) along with the reference based tracker 314 and the timing manager 305 (FIG. 3). As can be seen from FIG. 7, the combined system outperforms other systems in the flipping use case.

Figure 8:
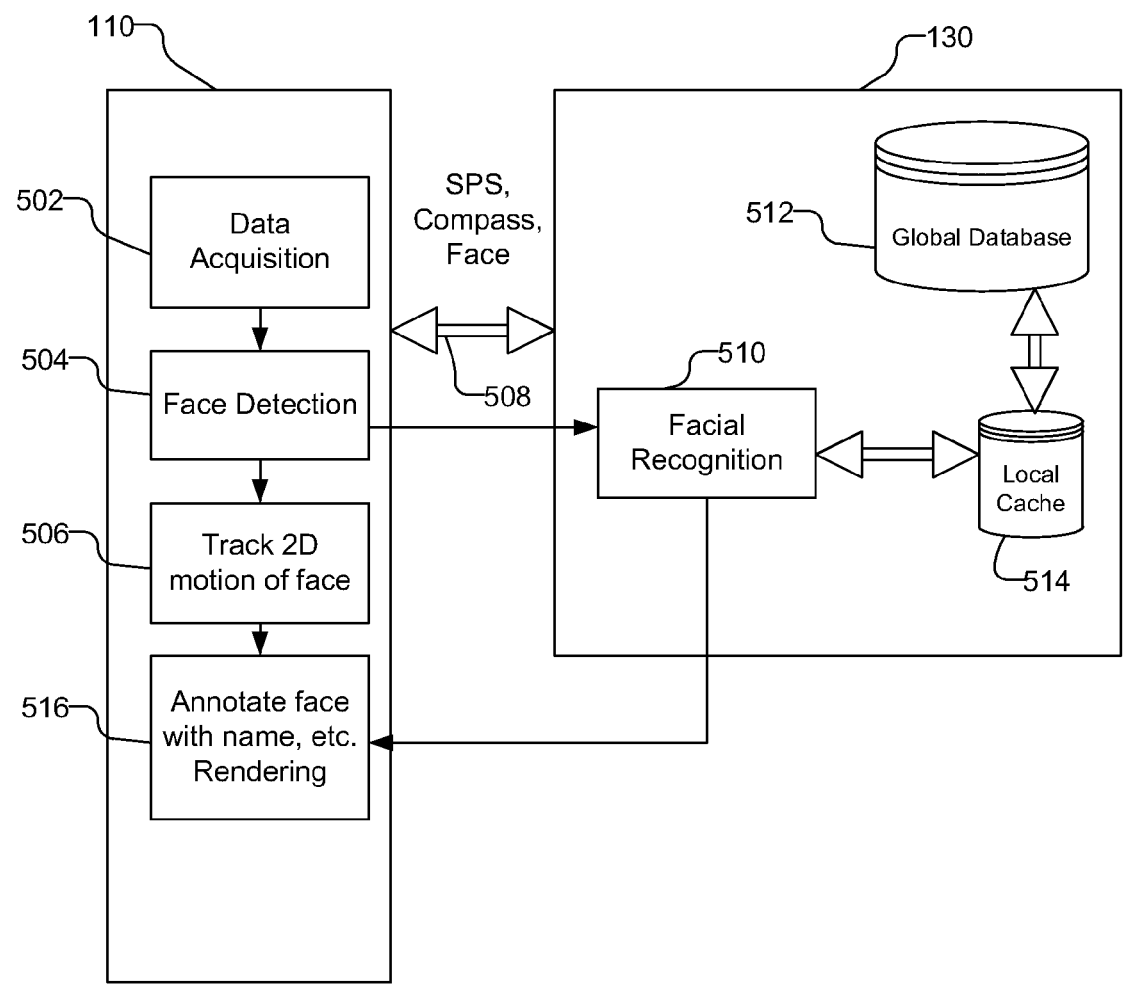
FIGS. 8 and 9 illustrate approaches to facial recognition using the server assisted AR process.

FIG. 8 illustrates an approach to facial recognition using the server assisted AR process. As illustrated in FIG. 8, a mobile platform 110 performs data acquisition 502, which includes acquiring an image of a face, as well as acquiring any other useful sensor information, such as SPS or position/motion sensor data. The mobile platform 110 performs face detection 504 and provides the face data for one or more faces (which may be an image of the face), as well as any other useful data, such as SPS or position/motion sensor data to the server 130, as indicated by arrow 506. The mobile platform 110 tracks the 2D motion of the face (508). The server 130 performs face recognition 510 based on the provided face data, e.g., using data retrieved from a global database 512 and stored in a local cache 514. The server 130 provides data related to the face, e.g., the identity or other desired information, to the mobile platform 110, which uses the received data to annotate the face displayed on display 114 with the name, etc. or to otherwise provide rendered augmented data (516).

Figure 9:
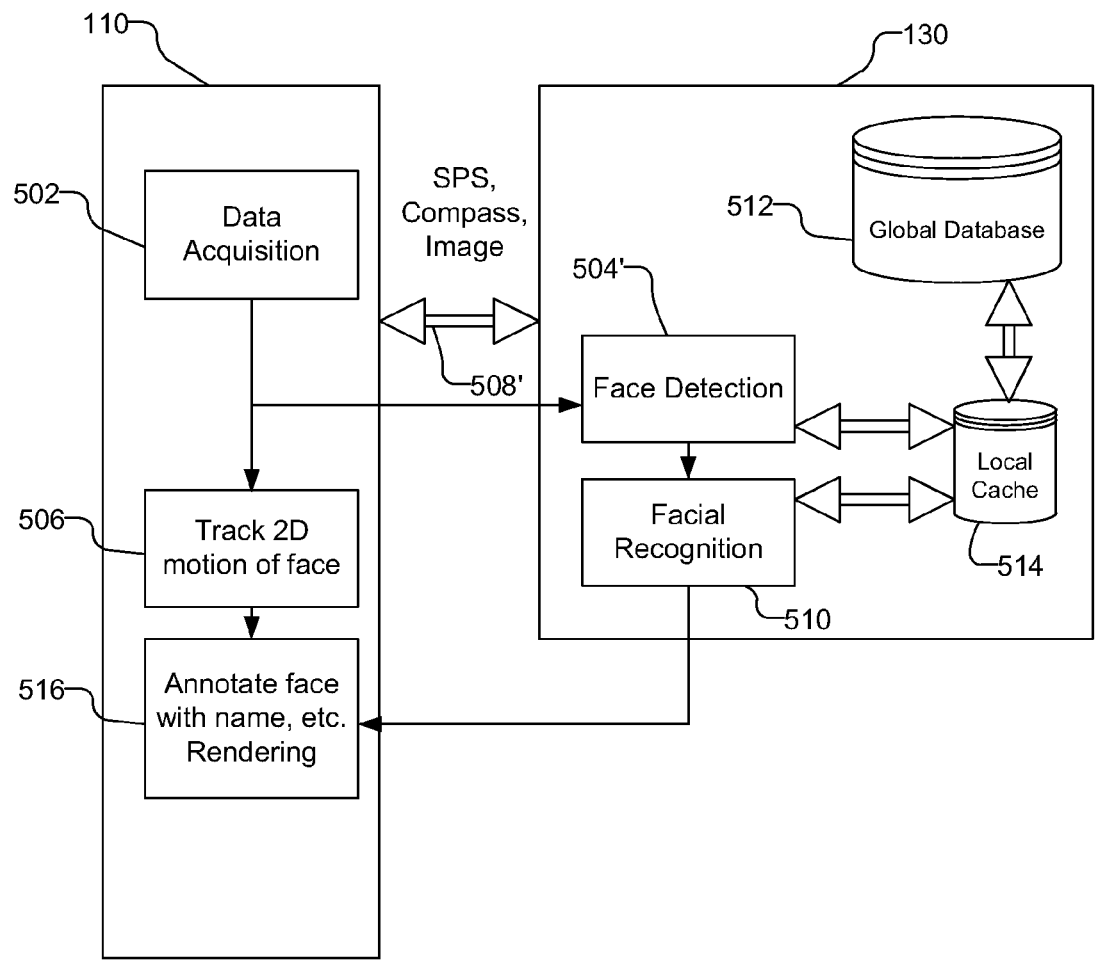

FIG. 9 illustrates another approach to face recognition using the server assisted AR process. FIG. 9 is similar to the approach illustrated in FIG. 8, like designated elements being the same. However, as illustrated in FIG. 9, the image is provided to the server 130 (508') and the face detection (504') is performed by the server 130.

Figure 10:
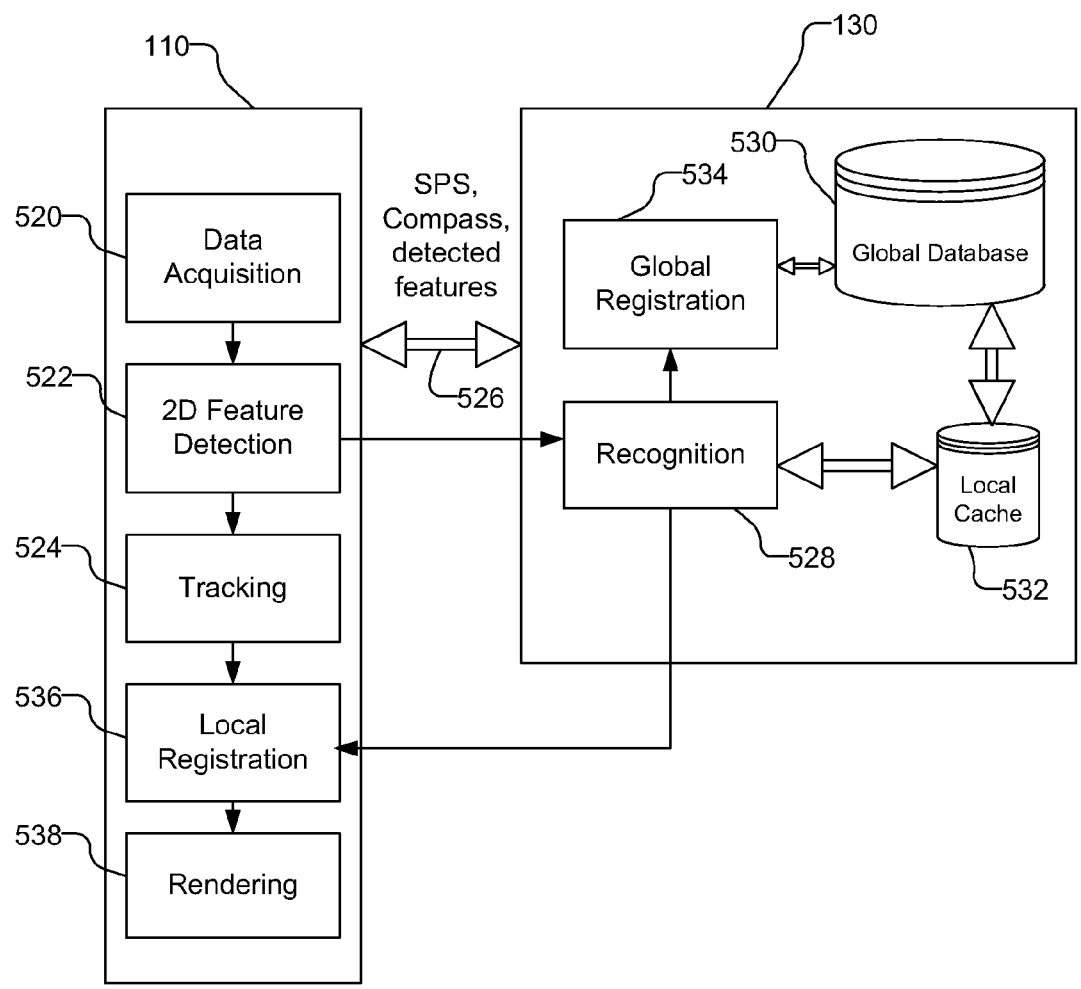
FIGS. 10 and 11 illustrate approaches to a visual search using the server assisted AR process.

FIG. 10 illustrates an approach to a visual search using the server assisted AR process. As illustrated in FIG. 10, a mobile platform 110 performs data acquisition (520), which includes acquiring an image of the desired object, as well as acquiring any other useful sensor information, such as SPS or position/motion sensor data. The mobile platform 110 performs feature detection (522) and provides the detected features, as well as any other useful data, such as SPS or position/motion sensor data to the server 130, as indicated by arrow 526. The mobile platform 110 tracks the 2D motion of the features (524). The server 130 performs the object recognition 528 based on the provided features, e.g., using data retrieved from a global database 530 and stored in a local cache 532. The server 130 may also perform global registration (534), e.g., to obtain a reference image, pose, etc. The server 130 provides the data related to the object, such as a reference image, pose, etc., to the mobile platform 110, which uses the received data to perform local registration (536). The mobile platform 110 may then render desired augmented data with respect to the object displayed on display 114 (538).

Figure 11:
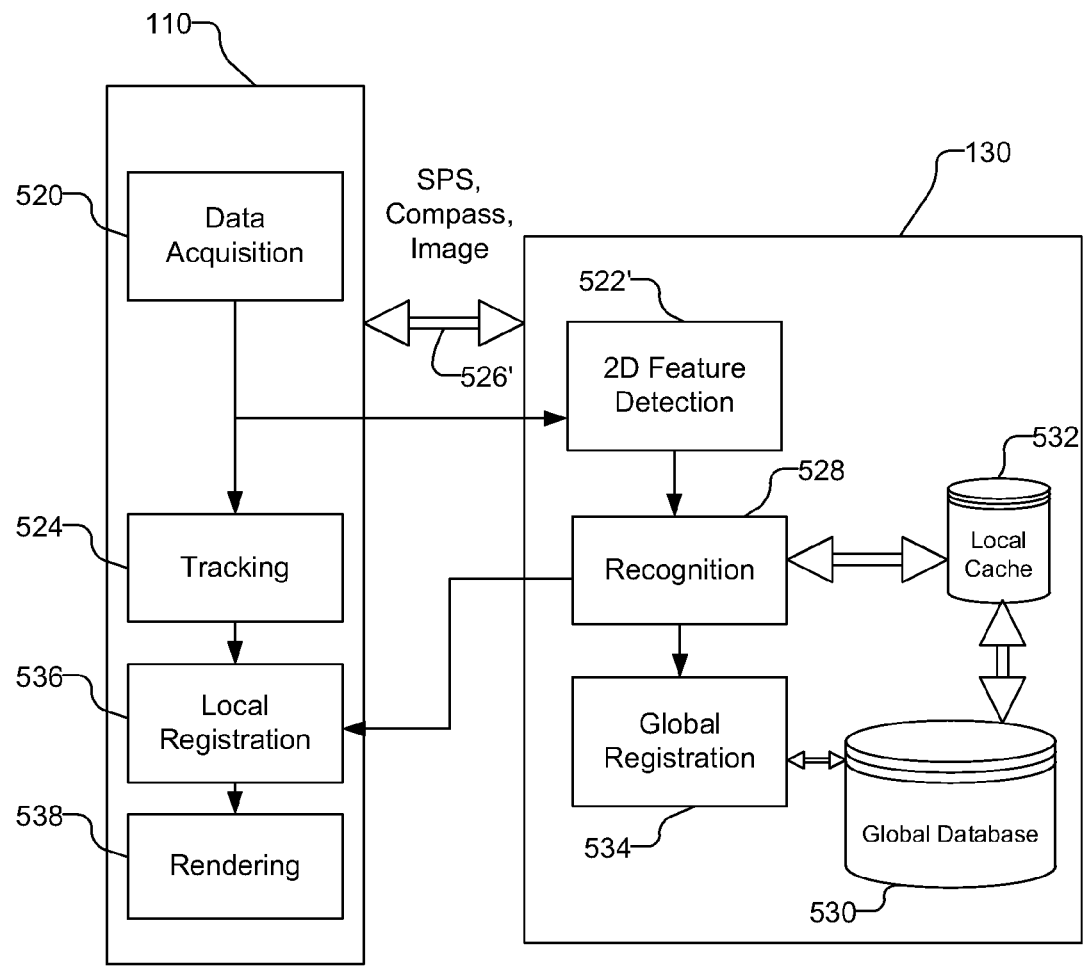

FIG. 11 illustrates another approach to a visual search using the server assisted AR process. FIG. 11 is similar to the approach illustrated in FIG. 10, like designated elements being the same. However, as illustrated in FIG. 11, the whole image is provided to the server 130 (526') and the feature detection (522') is performed by the server 130.

Figure 12:
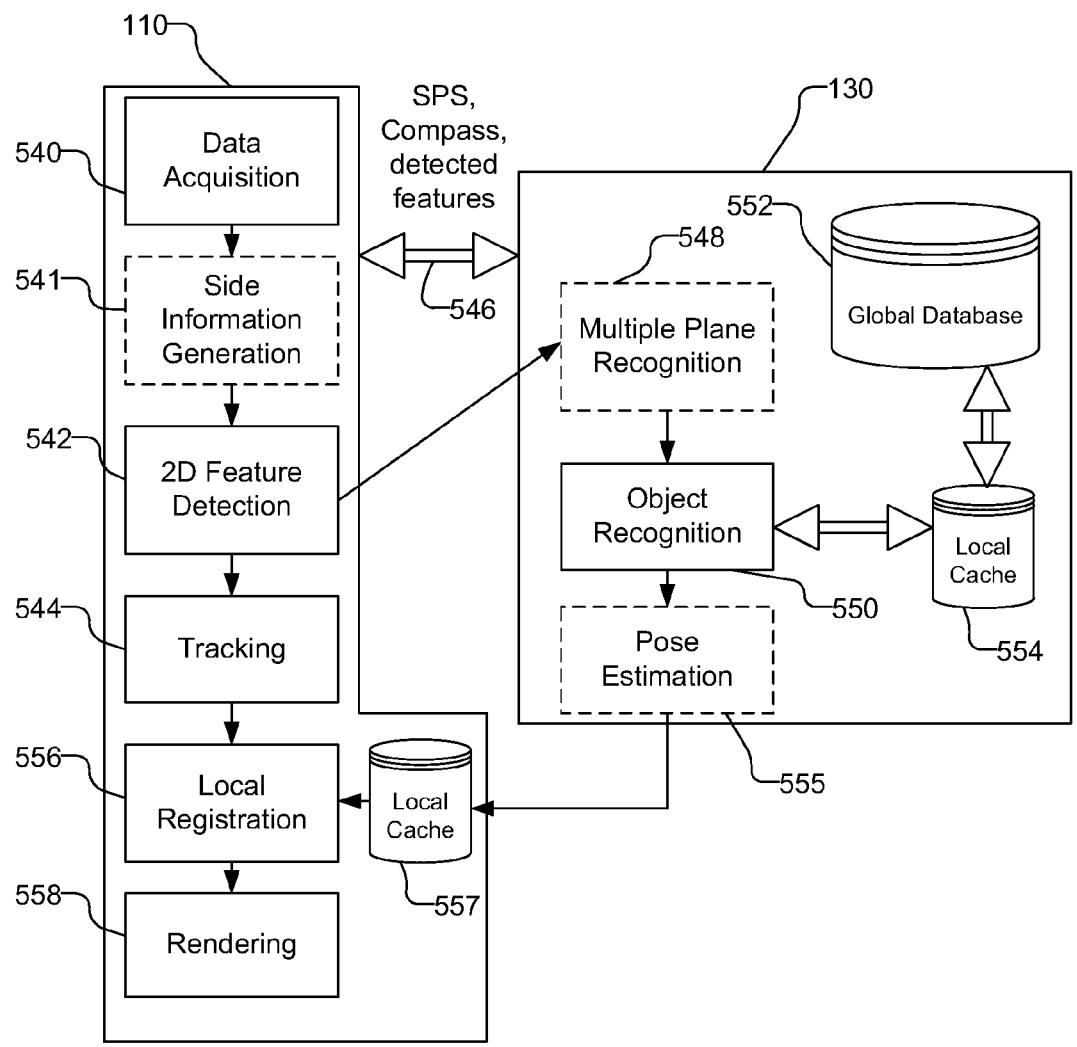
FIGS. 12 and 13 illustrate approaches to reference based tracking using the server assisted process.

FIG. 12 illustrates an approach to reference based tracking using the server assisted process. As illustrated in FIG. 12, a mobile platform 110 performs data acquisition (540), which includes acquiring an image of the desired object, as well as acquiring any other useful sensor information, such as SPS or position/motion sensor data. In some embodiments, the mobile platform 110 may generate side information (541), such as text recognition or bar code reading, etc. . . . The mobile platform 110 performs feature detection (542) and provides the detected features, as well as any other useful data, such as SPS or position/motion sensor data to the server 130, and side information if generated, as indicated by arrow 546. The mobile platform 110 tracks the 2D motion of the features (544), e.g., using point, line or region tracking, or dense optical flow. In some embodiments, the server 130 may perform a multiple plane recognition (548) using the provided features. Once the planes have been identified, object recognition (550) may be performed on the individual or a group of planes, e.g., using data retrieved from a global database 552 and stored in a local cache 554. If desired, any other recognition method may be used. In some embodiments, the server 130 may also perform pose estimation (555) if desired, which may be provided in six-degrees of freedom, with homography, affine, rotational and translational matrices. The server 130 provides the data related to the object, such as a reference image, to the mobile platform 110, which uses the received data to perform local registration (556), which may be a local homography registration or local essential matrix registration. As described above, the mobile platform 110 may include a local cache 557 to store the received data, which may be beneficial for subsequent re-detections that can be performed in the mobile platform 110 if tracking is lost. The mobile platform 110 may then render desired augmented data with respect to the object displayed on display 114 (558).

Figure 13:
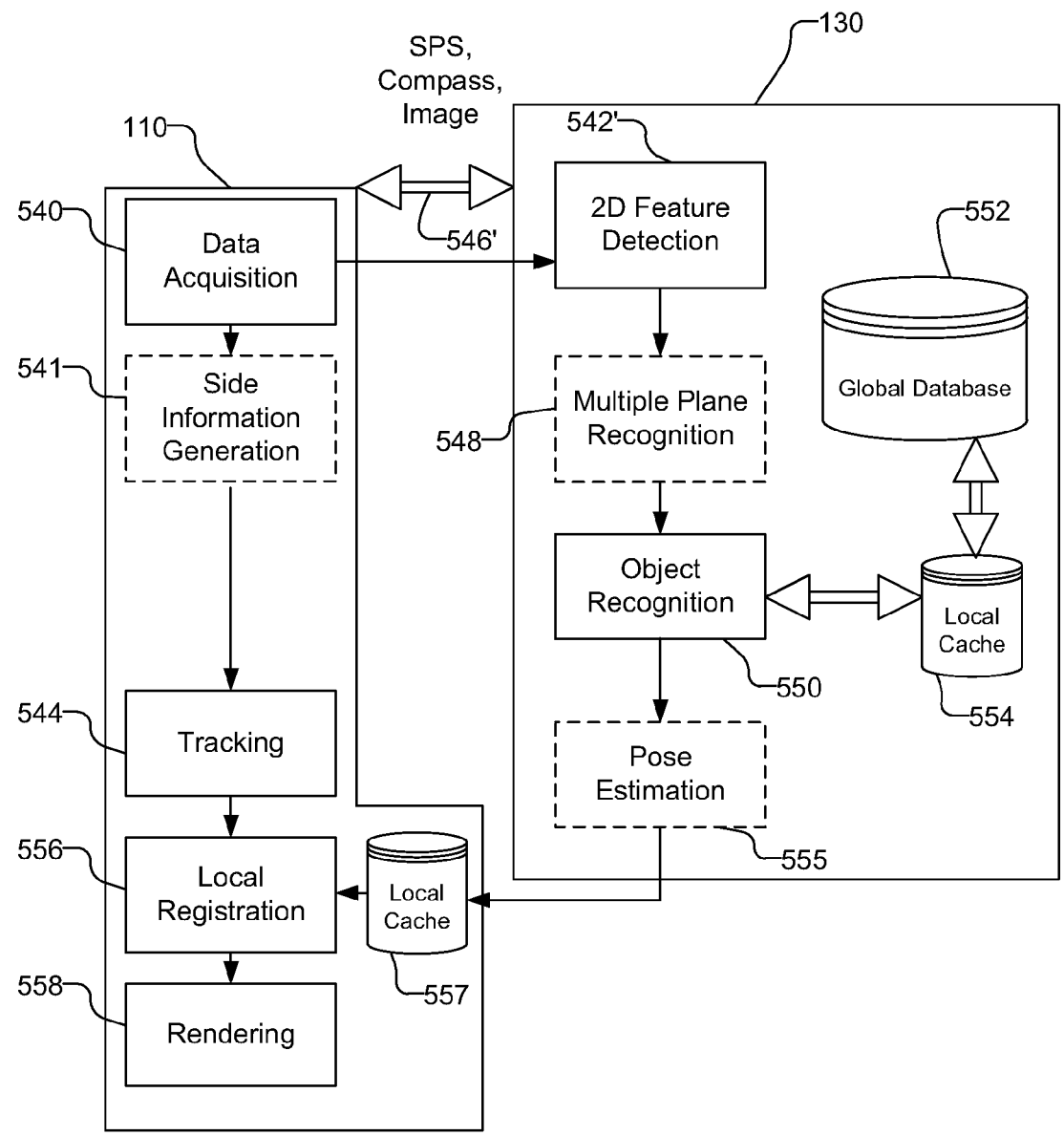

FIG. 13 illustrates another approach to reference based tracking using the server assisted process. FIG. 13 is similar to the approach illustrated in FIG. 12, like designated elements being the same. However, as illustrated in FIG. 13, the whole image is provided to the server 130 (546') and the feature detection (542') is performed by the server 130.

Figure 14:
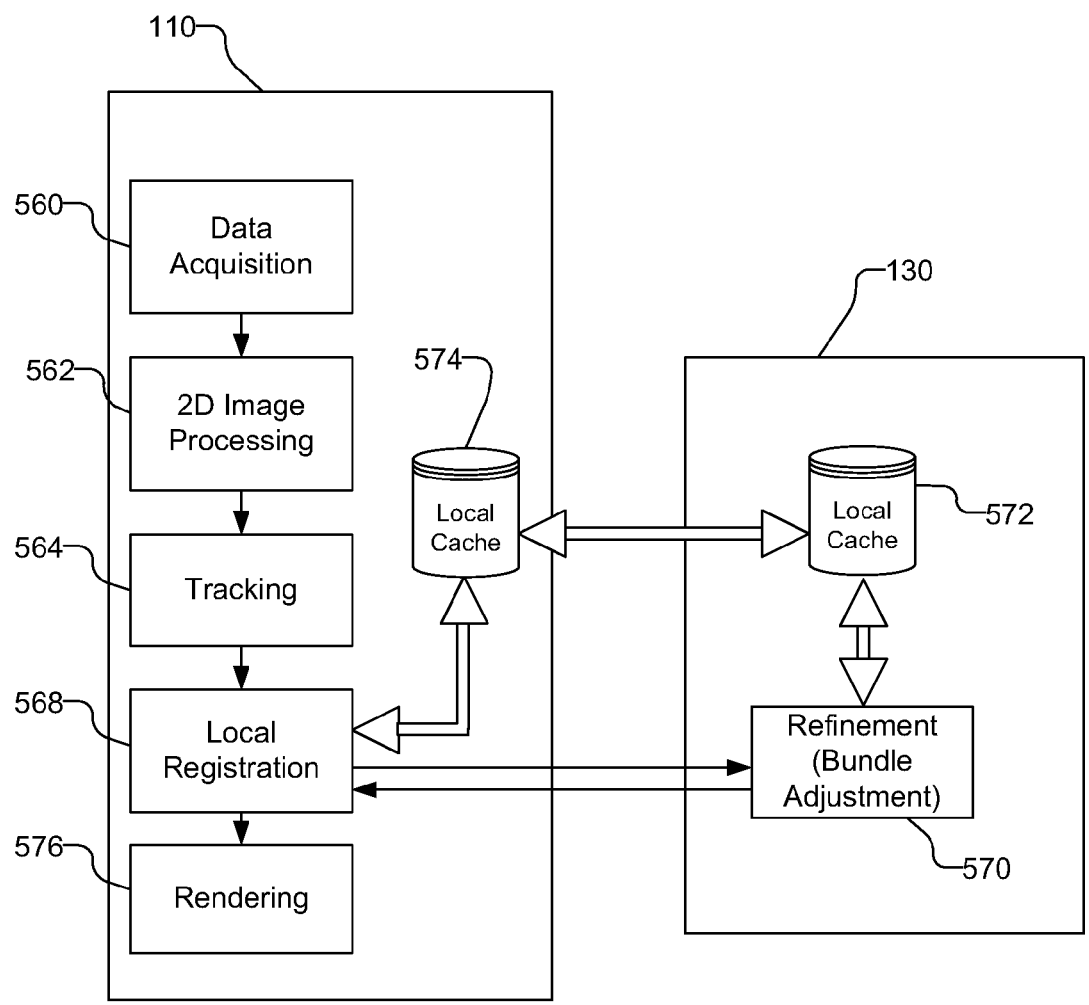
FIG. 14 illustrates an approach to 3D model creation using the server assisted process.

FIG. 14 illustrates an approach to 3D model creation using the server assisted process. As illustrated in FIG. 14, a mobile platform 110 performs data acquisition (560), which includes acquiring an image of the desired object, as well as acquiring any other useful sensor information, such as SPS or position/motion sensor data. The mobile platform 110 performs a 2D image processing (562) and tracks the motion (564) using reference free tracking, e.g., optical flow or normalized cross correlation based approaches. The mobile platform 110 performs a local six degree of freedom registration (568) to obtain the coarse estimate of the pose. This data along with the images in certain embodiments may be provided to the server 130. The server 130 then may perform bundle adjustment to refine the registration (570). Given a set of images and 3D point correspondences from different viewpoints, bundle adjustment algorithms help estimate the 3D coordinates of the point in a known reference coordinate system and help identify the relative motion of the camera between different viewpoints. Bundle adjustment algorithms are in general computationally intensive operations and can be efficiently done on the server side by passing side information from the mobile platform 110 and additional information if available from the local cache 572. After the location of 3D points and the relative pose are estimated they can be provided directly to the mobile platform 110. Alternatively, 3D models of the object may be constructed at the server based on the data and such data may be sent to the mobile platform 110. The mobile platform 110 may then render desired augmented data with respect to the object displayed on display 114 (576) using the information obtained from the server 130.

It should be noted that the entire system configuration may be adaptable depending on the capability of the mobile platform 110, the server 130, and the communication interface, e.g., network 120. If the mobile platform 110 is a low-end device without a dedicated processor, most of the operations may be off-loaded to the server 130. On the other hand, if the mobile platform 110 is a high end device that has good computation capability, the mobile platform 110 may select to perform some of the tasks and off-load fewer tasks to the server 130. Further, the system may be adaptable to handle different types of communication interfaces depending on, e.g., the available bandwidth on the interface.

In one implementation, the server 130 may provide feedback to the mobile platform 110 as to the task and what parts of a task can be off-loaded to the server 130. Such feedback may be based on the capabilities of the server 130, the type of operations to be performed, the available bandwidth in the communication channel, power levels of the mobile platform 110 and/or the server 130, etc. For example, the server 130 may recommend that the mobile platform 110 send a lower quality version of the image if the network connection is bad and the data rates are low. The server 130 may also suggest that the mobile platform perform more processing on the data and send processed data to the server 130 if the data rates are low. For instance, the mobile platform 110 may compute features for object detection and send the features instead of sending the entire image if the communication link has low data rate. The server 130 may alternatively recommend that the mobile platform 110 send a higher quality version of the image or send images more frequently (thereby reducing minimum frame gap TI) if the network connection is good or if the past attempts to recognize an object in the image have failed.

Moreover, the mobile-server architecture introduced herein can also be extended to scenarios where more than one mobile platform 110 is used. For example, two mobile platforms 110 may be viewing the same 3D object from different angles and the server 130 may perform a joint bundle adjustment from the data obtained from both mobile platforms 110 to create a good 3D model of the object. Such an application may be useful for applications such as multi-player gaming or the like.

Figure 15:
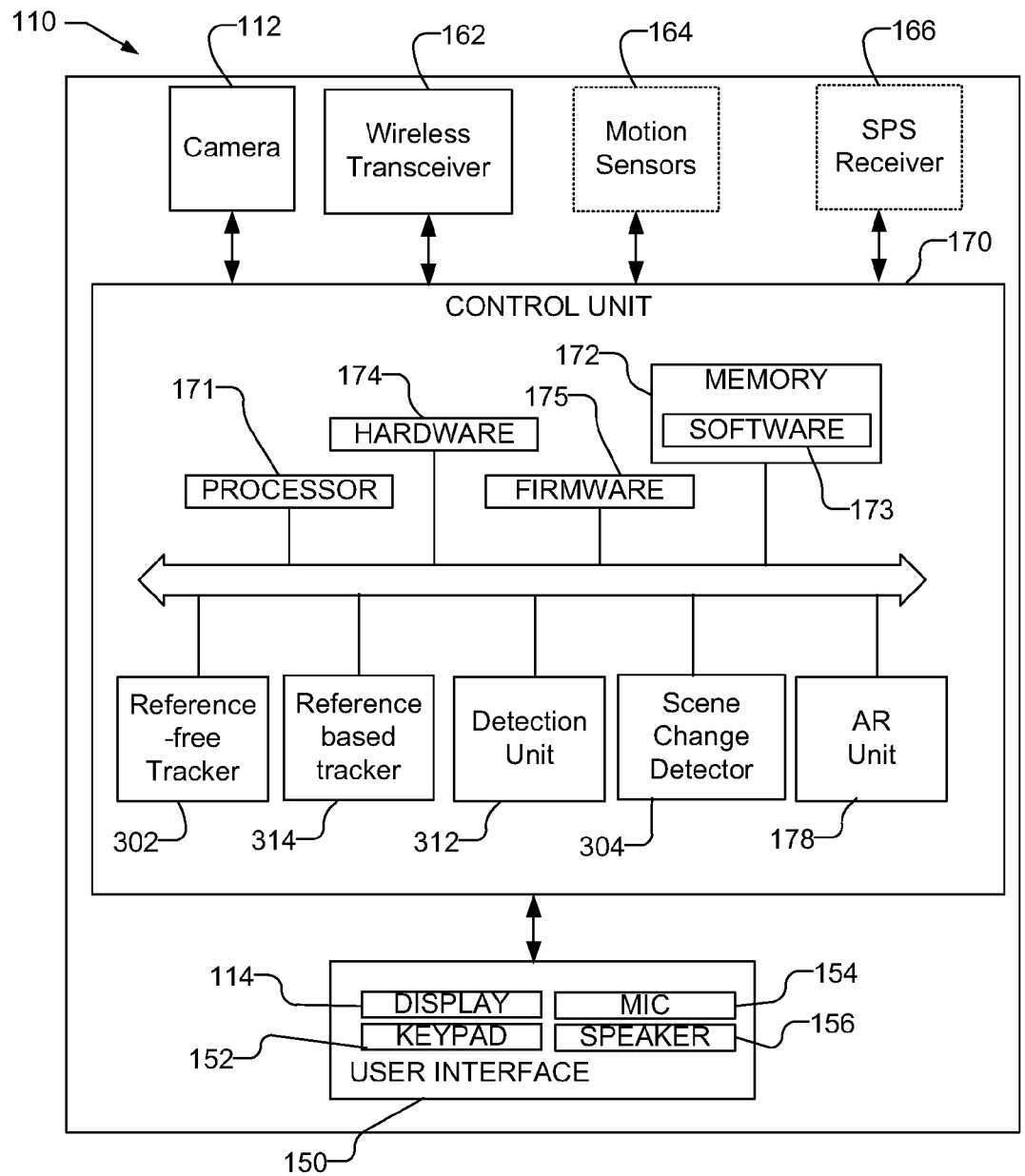
FIG. 15 is a block diagram of a mobile platform capable of distributed processing using server based detection.

FIG. 15 is a block diagram of a mobile platform 110 capable of distributed processing using server based detection. The mobile platform 110 includes the camera 112 as well as a user interface 150 that includes the display 114 capable of displaying images captured by the camera 112. The user interface 150 may also include a keypad 152 or other input device through which the user can input information into the mobile platform 110. If desired, the keypad 152 may be obviated by integrating a virtual keypad into the display 114 with a touch sensor. The user interface 150 may also include a microphone 154 and speaker 156, e.g., if the mobile platform is a cellular telephone.

Mobile platform 110 may include a wireless transceiver 162, which may be used to communicate with the external server 130 (FIG. 3), as discussed above. The mobile platform 110 may optionally include additional features that may be helpful for AR applications, such as motion sensors 164 including, e.g., accelerometers, gyroscopes, electronic compass, or other similar motion sensing elements, and a satellite positioning system (SPS) receiver 166 capable of receiving positioning signals from an SPS system. Of course, mobile platform 110 may include other elements unrelated to the present disclosure.

The mobile platform 110 also includes a control unit 170 that is connected to and communicates with the camera 112 and wireless transceiver 162, along with other features, such as the user interface 150, motion sensors 164 and SPS receiver 166 if used. The control unit 170 accepts and processes data from the camera 112 and controls the communication with the external server through the wireless transceiver 162 in response, as discussed above. The control unit 170 may be provided by a processor 171 and associated memory 172, which may include software 173 executed by the processor 171 to perform the methods or parts of the methods described herein. The control unit 170 may additionally or alternatively include hardware 174 and/or firmware 175.

The control unit 170 includes the scene change detector 304 which triggers communication with the external server based as discussed above. Additional components, such as the trigger time manager 305 and image quality estimator 306, illustrated in FIG. 3, may be also included. The control unit 170 further includes the reference free tracker 302, reference based tracker 314 and detection unit 312, which is used to detect objects in a current image based on objects stored in local cache, e.g., in memory 172. The control unit 170 further includes the augmented reality (AR) unit 178 to generate and display AR information on the display 114. The scene change detector 304, reference free tracker 302, reference based tracker 314 detection unit 312, and AR unit 178 are illustrated separately and separate from processor 171 for clarity, but may be a single unit and/or implemented in the processor 171 based on instructions in the software 173 which is read by and executed in the processor 171. It will be understood as used herein that the processor 171, as well as one or more of the scene change detector 304, reference free tracker 302, reference based tracker 314 detection unit 312, and AR unit 178 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 174, firmware175, software 173, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Thus, the device to acquire sensor data may comprise camera 112, the SPS receiver 166, and motion sensors 164, as well as the processor which may produce side information, such as text recognition or bar code reading, based on the image produced by the camera 112 for acquiring sensor data. The device to determine whether there is a trigger event comprising a change in the sensor data relative to previously acquired sensor data comprises the detection unit 312, which may be implemented by processor 171 performing instructions embodied in software 173, or in hardware 174 or firmware 175, for determining whether there is a trigger event comprising a change in the sensor data relative to previously acquired sensor data. The device to transmit the sensor data to a server when there is the trigger event comprises wireless transceiver 162 for transmitting the sensor data to a server when there is the trigger event. The device to receive information related to the sensor data from the server comprises the wireless transceiver 162 for receiving information related to the sensor data from the server. The device to obtain a pose of the mobile platform with respect to the object comprises the reference free tracker 302, the wireless transceiver 162, for obtaining a pose of the mobile platform with respect to the object. The device to track the object using the pose and the reference image of the object comprises the reference based tracker 314 for tracking the object using the pose and the reference image of the object. The device to determine whether there is a scene change in the captured image with respect to a previous captured image comprises the scene change detector 304, which may be implemented by processor 171 performing instructions embodied in software 173, or in hardware 174 or firmware 175, for determining whether there is a scene change in the captured image with respect to a previous captured image.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software 173 may include program codes stored in memory 172 and executed by the processor 171. Memory may be implemented within or external to the processor 171.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   acquiring image data using a mobile platform, wherein the image data is from at least one captured image of an object;
   tracking the object with visual based tracking using the at least one captured image of the object;
   determining whether there is a trigger event comprising a change in the image data relative to previously acquired image data, wherein the trigger event comprises a scene change in which a different object appears in the at least one captured image with respect to a previous captured image;
   transmitting the image data to a server when there is the trigger event while continuing to track the object with visual based tracking using the at least one captured image of the object;
   receiving information related to the image data from the server, wherein the information related to the image data comprises at least one of the following: a two dimensional (2D) model of the different object, a three dimensional (3D) model of the different object, a three-dimensional coordinate estimation of points on the different object, augmentation information, saliency information about the different object, and information related to object matching; and
   tracking the different object using the information related to the image data received from the server.

2. The method of claim 1, wherein tracking the object further comprises using a reference image of the object received from the server.

3. The method of claim 1, the method further comprising determining a quality of the at least one captured image before transmitting the image data to the server, wherein the image data is transmitted to the server only if the quality of the at least one captured image is better than a threshold.

4. The method of claim 3, wherein determining the quality of the at least one captured image comprises at least one of analyzing a degree of sharpness of the at least one captured image, analyzing a number of detected corners in the at least one captured image; and using statistics derived from the at least one captured image with a learning classifier.

5. The method of claim 1, further comprising rendering augmentation with respect to the different object based on the information related to the image data received from the server.

6. The method of claim 1, wherein the information related to the image data comprises an identification of the different object.

7. The method of claim 1, wherein the at least one captured image comprises a plurality of objects and the information related to the image data comprises an identification of the plurality of objects.

8. The method of claim 7, further comprising:
   obtaining poses for each of the plurality of objects with respect to the mobile platform; and
   tracking each of the plurality of objects using the poses and the information related to the image data.

9. The method of claim 1, further comprising:
   obtaining a pose of the mobile platform with respect to the different object; and
   wherein tracking the different object uses the pose and the information related to the image data.

10. The method of claim 9, wherein the information related to the image data comprises a reference image of the different object, and wherein obtaining the pose comprises receiving from the server a first pose based on the at least one captured image and the reference image.

11. The method of claim 10, wherein continuing to track the object with visual based tracking comprises performing reference-free tracking of the object until the first pose is received from the server.

12. The method of claim 10, further comprising:
    acquiring a second captured image of the different object when the first pose is received from the server;
    tracking the different object between the at least one captured image and the second captured image to determine an incremental change; and
    using the incremental change and the first pose to obtain the pose of the mobile platform with respect to the different object.

13. The method of claim 10, further comprising:
    acquiring a second captured image of the different object;
    detecting the different object in the second captured image using the reference image;
    using the different object detected in the second captured image and the reference image to obtain the pose of the mobile platform with respect to the different object; and
    using the pose to initialize reference based tracking of the different object.

14. The method of claim 1, wherein determining whether there is the scene change comprises:
    determining a first change metric using the at least one captured image and the previous captured image;
    determining a second change metric using the at least one captured image and a second previous captured image from a previous trigger event;
    generating a histogram change metric for the at least one captured image; and
    using the first change metric, the second change metric and the histogram change metric to determine the scene change.

15. The method of claim 1, wherein the information related to the image data comprises an object identification, the method further comprising:
    acquiring additional captured images of the different object;
    identifying the different object in the additional captured images using the object identification;
    generating a tracking mask for the additional captured images based on the object identification, the tracking mask indicating regions in the additional captured images where the different object is identified;
    using the tracking mask with the additional captured images of the different object to identify remaining regions of the additional captured images; and
    detecting trigger events comprising scene changes in the remaining regions of the additional captured images.

16. The method of claim 1, further comprising acquiring sensor data comprising at least one of motion sensor data, position data, barcode recognition, text detection results, or contextual information, and transmitting the sensor data with the image data to the server.

17. The method of claim 16, wherein the contextual information includes one or more of the following: user behavior, user preferences, location, information about a user, time of day, and lighting quality.

18. The method of claim 1, wherein the image data is from a plurality of images of the object captured with a camera at different positions, the method further comprising determining a coarse estimate of a pose of the camera with respect to the object and transmitting the coarse estimate of the pose with the image data, and the information received from the server comprises at least one of a refinement of the pose and a three-dimensional model of the object.

19. The method of claim 1, wherein the image data is from a plurality of images of the object captured with a camera at different positions, and the information received from the server further comprises a pose of the object relative to the camera.

20. A mobile platform comprising:
a sensor that acquires image data, wherein the sensor is a camera and the image data is from at least one captured image of an object;
a wireless transceiver; and
a processor coupled to the sensor and the wireless transceiver, the processor acquires the image data via the sensor, tracks the object with visual based tracking using the at least one captured image of the object, determines whether there is a trigger event comprising a change in the image data relative to previously acquired image data, wherein the trigger event comprises a scene change in which a different object appears in the at least one captured image with respect to a previous captured image, transmits via the wireless transceiver the image data to an external processor when the trigger event is present while continuing to track the object with visual based tracking using the at least one captured image of the object, and receives information related to the image data from the external processor via the wireless transceiver, wherein the information related to the image data comprises at least one of the following: a two dimensional (2D) model of the different object, a three dimensional (3D) model of the different object, a three-dimensional coordinate estimation of points on the different object, augmentation information, saliency information about the different object, and information related to object matching, and tracks the different object using the information related to the image data received from the external processor.

21. The mobile platform of claim 20, wherein the processor tracks the object using a reference image of the object received from the external processor.

22. The mobile platform of claim 20, wherein the processor further determines a quality of the at least one captured image before the image data is transmitted to the external processor, wherein the image data is transmitted to the external processor only if the quality of the at least one captured image is better than a threshold.

23. The mobile platform of claim 22, wherein the processor determines the quality of the at least one captured image by performing at least one of a degree of sharpness analysis of the at least one captured image, an analysis of a number of detected corners in the at least one captured image; and processing of a learning classifier with statistics derived from the at least one captured image.

24. The mobile platform of claim 20, wherein the processor further renders augmentation with respect to the different object based on the information related to the image data received via the wireless transceiver.

25. The mobile platform of claim 20, wherein the information related to the image data comprises an identification of the different object.

26. The mobile platform of claim 20, wherein the at least one captured image comprises a plurality of objects and the information related to the image data comprises an identification of the plurality of objects.

27. The mobile platform of claim 26, wherein the processor obtains poses for each of the plurality of objects with respect to the mobile platform, and track each of the plurality of objects using the poses and the information related to the image data.

28. The mobile platform of claim 20, wherein the processor further obtains a pose of the mobile platform with respect to the different object and tracks the different object using the pose and the information related to the image data.

29. The mobile platform of claim 28, wherein the information related to the image data comprises a reference image of the different object, and wherein the processor receives from the external processor a first pose based on the at least one captured image and the reference image.

30. The mobile platform of claim 29, wherein the processor continues to track the object with visual based tracking by performing reference-free tracking of the object until the first pose is received from the external processor.

31. The mobile platform of claim 29, wherein the processor further acquires a second captured image of the different object when the first pose is received from the external processor, tracks the different object between the at least one captured image and the second captured image to determine an incremental change, uses the incremental change and the first pose to obtain the pose of the mobile platform with respect to the different object.

32. The mobile platform of claim 29, wherein the processor further acquires a second captured image of the different object, detects the different object in the second captured image using the reference image, uses the different object detected in the second captured image and the reference image to obtain the pose of the mobile platform with respect to the different object, and uses the pose to initialize reference based tracking of the different object.

33. The mobile platform of claim 20, wherein the processor determines whether there is the scene change by determining a first change metric using the at least one captured image and the previous captured image, determines a second change metric using the at least one captured image and a second previous captured image from a previous trigger event, generates a histogram change metric for the at least one captured image, and uses the first change metric, the second change metric and the histogram change metric to determine the scene change.

34. The mobile platform of claim 20, wherein the information related to the image data comprises an object identification, wherein the processor acquires additional captured images of the different object, identifies the different object in the additional captured images using the object identification, generates a tracking mask for the additional captured images based on the object identification, the tracking mask indicating regions in the additional captured images where the different object is identified, uses the tracking mask with the additional captured images of the different object to identify remaining regions of the additional captured images, and detects trigger events comprising scene changes in the remaining regions of the additional captured images.

35. The mobile platform of claim 20, further comprising at least one additional sensor that acquires sensor data comprising at least one of motion sensor data, position data, barcode recognition, text detection results, or contextual information, and wherein the sensor data is transmitted with the image data to the external processor.

36. The mobile platform of claim 35, wherein the contextual information includes one or more of the following: user behavior, user preferences, location, information about a user, time of day, and lighting quality.

37. The mobile platform of claim 20, wherein the image data is from a plurality of images of the object captured with the camera at different positions, and the processor determines a coarse estimate of a pose of the camera with respect to the object and transmits the coarse estimate of the pose with the image data, the information received from the external processor further comprises at least one of a refinement of the pose and a three-dimensional model of the object.

38. The mobile platform of claim 20, wherein the image data is from a plurality of images of the object captured with the camera at different positions, and the information received from the external processor further comprises a pose of the object relative to the camera.

39. A mobile platform comprising:
   means for acquiring image data, wherein the means for acquiring image data is a camera and the image data is from at least one captured image of an object;
   means for tracking the object with visual based tracking using the at least one captured image of the object;
   means for determining whether there is a trigger event comprising a change in the image data relative to previously acquired image data, wherein the trigger event comprises a scene change in which a different object appears in the at least one captured image with respect to a previous captured image;
   means for transmitting the image data to a server when there is the trigger event while continuing to track the object with visual based tracking using the at least one captured image of the object;
   means for receiving information related to the image data from the server, wherein the information related to the image data comprises at least one of the following: a two dimensional (2D) model of the different object, a three dimensional (3D) model of the different object, a three-dimensional coordinate estimation of points on the different object, augmentation information, saliency information about the different object, and information related to object matching; and
   means for tracking the different object using the information related to the image data received from the server.

40. The mobile platform of claim 39, wherein the means for tracking the object further uses a reference image of the object received from the server.

41. A non-transitory computer-readable medium including program code stored thereon, comprising:
   program code to acquire image data, wherein the image data is from at least one captured image of an object;
   program code to track the object with visual based tracking using the at least one captured image of the object;
   program code to determine whether there is a trigger event comprising a change in the image data relative to previously acquired image data, wherein the trigger event comprises a scene change in which a different object appears in the at least one captured image with respect to a previous captured image;
   program code to transmit the image data to an external processor when the trigger event is present while continuing to track the object with visual based tracking using the at least one captured image of the object,
   program code to receive information related to the image data from the external processor, wherein the information related to the image data comprises at least one of the following: a two dimensional (2D) model of the different object, a three dimensional (3D) model of the different object, a three-dimensional coordinate estimation of points on the different object, augmentation information, saliency information about the different object, and information related to object matching; and
   program code to track the different object using the information related to the image data received from the server.

42. The non-transitory computer-readable medium of claim 41, wherein the program code to track the object further uses a reference image of the object received from the external processor.

* * * * *